(12) United States Patent
Oshita

(10) Patent No.: US 12,461,071 B2
(45) Date of Patent: Nov. 4, 2025

(54) ODOR DETECTION DEVICE AND ODOR DETECTION METHOD

(71) Applicant: TAIYO YUDEN CO., LTD., Tokyo (JP)

(72) Inventor: Junji Oshita, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 330 days.

(21) Appl. No.: 18/335,036

(22) Filed: Jun. 14, 2023

(65) Prior Publication Data

US 2023/0324344 A1 Oct. 12, 2023

Related U.S. Application Data

(63) Continuation of application No. PCT/JP2020/048470, filed on Dec. 24, 2020.

(51) Int. Cl.
| | |
|---|---|
| *G01N 29/22* | (2006.01) |
| *B08B 5/00* | (2006.01) |
| *G01N 29/036* | (2006.01) |
| *G01N 29/02* | (2006.01) |

(52) U.S. Cl.
CPC .......... *G01N 29/222* (2013.01); *B08B 5/00* (2013.01); *G01N 29/036* (2013.01); *G01N 29/022* (2013.01)

(58) Field of Classification Search
CPC .. G01N 29/222; G01N 29/036; G01N 29/022; G01N 2291/0215; G01N 5/02; B08B 5/00
See application file for complete search history.

(56) References Cited

U.S. PATENT DOCUMENTS

| | | | |
|---|---|---|---|
| 12,117,188 B2 * | 10/2024 | Alayil | ............ F24F 3/16 |
| 2015/0152467 A1 * | 6/2015 | Ingber | ...... B01L 3/502753 |
| | | | 422/534 |

(Continued)

FOREIGN PATENT DOCUMENTS

| | | | | |
|---|---|---|---|---|
| CN | 114088594 A | * | 2/2022 | ............ G01N 5/02 |
| JP | S62-121545 U | | 8/1987 | |
| JP | H10-170461 A | | 6/1998 | |

(Continued)

OTHER PUBLICATIONS

International Search Report (ISR) issued in PCT/JP2020/048470 mailed in Mar. 2021.

(Continued)

*Primary Examiner* — Francis C Gray
(74) *Attorney, Agent, or Firm* — CHEN YOSHIMURA LLP

(57) ABSTRACT

An odor detection device includes a sensor chamber housing a sensor element, the sensor chamber having a first inlet, a first outlet, a second inlet, and a second outlet, the first and second outlets being located opposite the first and second inlets with the sensor element interposed therebetween, respectively, a flow channel including a filter therein, the flow channel being connected to the second outlet and being connected to the second inlet, a first gas delivery unit causing inflow of a gas at the first inlet and outflow of the gas at the first outlet, and a second gas delivery unit causing outflow of the gas at the second outlet and inflow of the gas at the second inlet.

7 Claims, 27 Drawing Sheets

(56) References Cited

U.S. PATENT DOCUMENTS

2018/0286726 A1   10/2018  Rebstock
2023/0383974 A1* 11/2023  Alayil ...................... F24F 3/16

FOREIGN PATENT DOCUMENTS

| JP | H11-083820 A | 3/1999 | | |
|----|---|---|---|---|
| JP | 2002-039939 A | 2/2002 | | |
| JP | 2002-168748 A | 6/2002 | | |
| JP | 2016-090484 A | 5/2016 | | |
| JP | 2018-536984 A | 12/2018 | | |
| JP | 2019-120561 A | 7/2019 | | |
| JP | 6956097 B2 * | 10/2021 | ............. | G01N 30/34 |
| WO | WO-2023119851 A1 * | 6/2023 | ............... | G01N 5/02 |

OTHER PUBLICATIONS

Written Opinion (PCT/ISA/237) issued in PCT/JP2020/048470 mailed in Mar. 2021.
English translation of Written Opinion (PCT/ISA/237) issued in PCT/JP2020/048470 mailed in Mar. 2021.

* cited by examiner

ODOR DETECTION DEVICE AND ODOR DETECTION METHOD

FIELD

A certain aspect of the present disclosure relates to an odor detection device and an odor detection method for detecting an odor component in a gas.

BACKGROUND

The odor sensor includes a sensitive film that adsorbs an odor component in a gas. The odor component can be detected by vibrating the sensitive film at a predetermined frequency and observing a frequency variation due to adsorption of the odor component. In such odor sensors, after measuring the odor component, it is necessary to clean the sensitive film and remove the odor component adsorbed on the sensitive film before the next measurement.

For example, Japanese Patent Application Laid-Open No. H10-170461 (Patent Document 1) discloses a technique in which a flow path is switched by a valve to switch between a sample gas and cleaning air. Japanese Patent Application Laid-Open No. 2019-120561 (Patent Document 2) also discloses a technique capable of physically switching the flow paths of a test fluid and a control fluid (cleaning gas). Further, Japanese Patent Application Laid-Open No. 2002-39939 (Patent Document 3) discloses a technique for circulating a clean gas during gas cleaning by switching a flow path using opening and closing of a valve. Japanese Patent Application Laid-Open No. 2016-90484 (Patent Document 4) discloses a technique for circulating a clean gas (purge gas) during gas cleaning.

RELATED ART DOCUMENTS

Patent Documents

Japanese Patent Application Laid-Open No. H10-170461
Japanese Patent Application Laid-Open No. 2019-120561
Japanese Patent Application Laid-Open No. 2002-39939
Japanese Patent Application Laid-Open No. 2016-90484

SUMMARY

However, in the configuration described in Patent Document 1, the apparatus is large-scale, and switching of the valve is not easy. Further, in the configuration described in Patent Document 2, the cleaning gas is required to have a stable composition, but it cannot be said that air is sufficiently stable, and if a standard gas is separately prepared, the apparatus becomes large-scale. Further, in the configuration described in Patent Document 3, it is necessary to control opening and closing of the valve, and a specific flow path structure is not disclosed. Further, in the configuration described in Patent Document 4, there is no disclosure of how to specifically control and circulate the clean gas.

Therefore, an object of the present disclosure is to provide an odor detection device and an odor detection method having a simple structure and a high cleaning effect.

In one aspect of the present disclosure, there is provided an odor detection device including: a sensor chamber in which a sensor element is housed, the sensor chamber having a first inlet, a first outlet, a second inlet, and a second outlet, the first outlet being located opposite the first inlet with the sensor element interposed therebetween, the second outlet being located opposite the second inlet with the sensor element interposed therebetween; a flow channel including a filter therein, the flow channel being connected to the second outlet and being connected to the second inlet; a first gas delivery unit causing inflow of a gas at the first inlet and outflow of the gas at the first outlet; and a second gas delivery unit causing outflow of the gas at the second outlet and inflow of the gas at the second inlet.

The flow channel may be provided above or under the sensor chamber so as to overlap with the sensor chamber when viewed from above.

The flow channel may have a meandering shape in a plane orthogonal to a vertical direction.

The flow channel may include a first portion extending in a first direction, a second portion that is located downstream of the first portion and extends in a second direction opposite to the first direction, and a third portion that is located downstream of the second portion and extends in the first direction.

The sensor chamber may include a first chamber having the first inlet and the second inlet, a second chamber having the first outlet and the second outlet, and a throttle portion restricting gas flow from the first chamber to the second chamber, the first chamber being communicated with the second chamber.

The odor detection device may further include a control unit configured to alternately achieve a state in which a gas is caused to flow into the sensor chamber from the first inlet and the gas is caused to be discharged from the first outlet and a state in which the gas is caused to flow from the sensor chamber into the flow channel through the second outlet and the gas is caused to flow from the flow channel into the sensor chamber through the second inlet by alternately switching between a first state in which the first gas delivery unit is operated and the second gas delivery unit is stopped and a second state in which the first gas delivery unit is stopped and the second gas delivery unit is operated.

In another aspect of the present disclosure, there is provided an odor detection method including: a detection step in which a first gas delivery unit is driven and a second gas delivery unit is stopped to cause a gas to flow from a first inlet into a sensor chamber and cause the gas to be discharged from a first outlet, the sensor chamber housing a sensor element for detecting an odor component; and a cleaning step in which the first gas delivery unit is stopped and the second gas delivery unit is driven to cause the gas to flow from the sensor chamber into a flow channel through a second outlet and cause the gas from the flow channel to the sensor chamber through a second inlet, the flow channel connecting the second outlet and the second inlet, the flow channel having a filter for removing the odor component therein, the second outlet being provided in the sensor chamber, the second inlet being provided in the sensor chamber.

DETAILED DESCRIPTION

An odor detection device in accordance with an embodiment of the present disclosure will be described.

[Configuration of Odor Detection Device]

Figure 1:
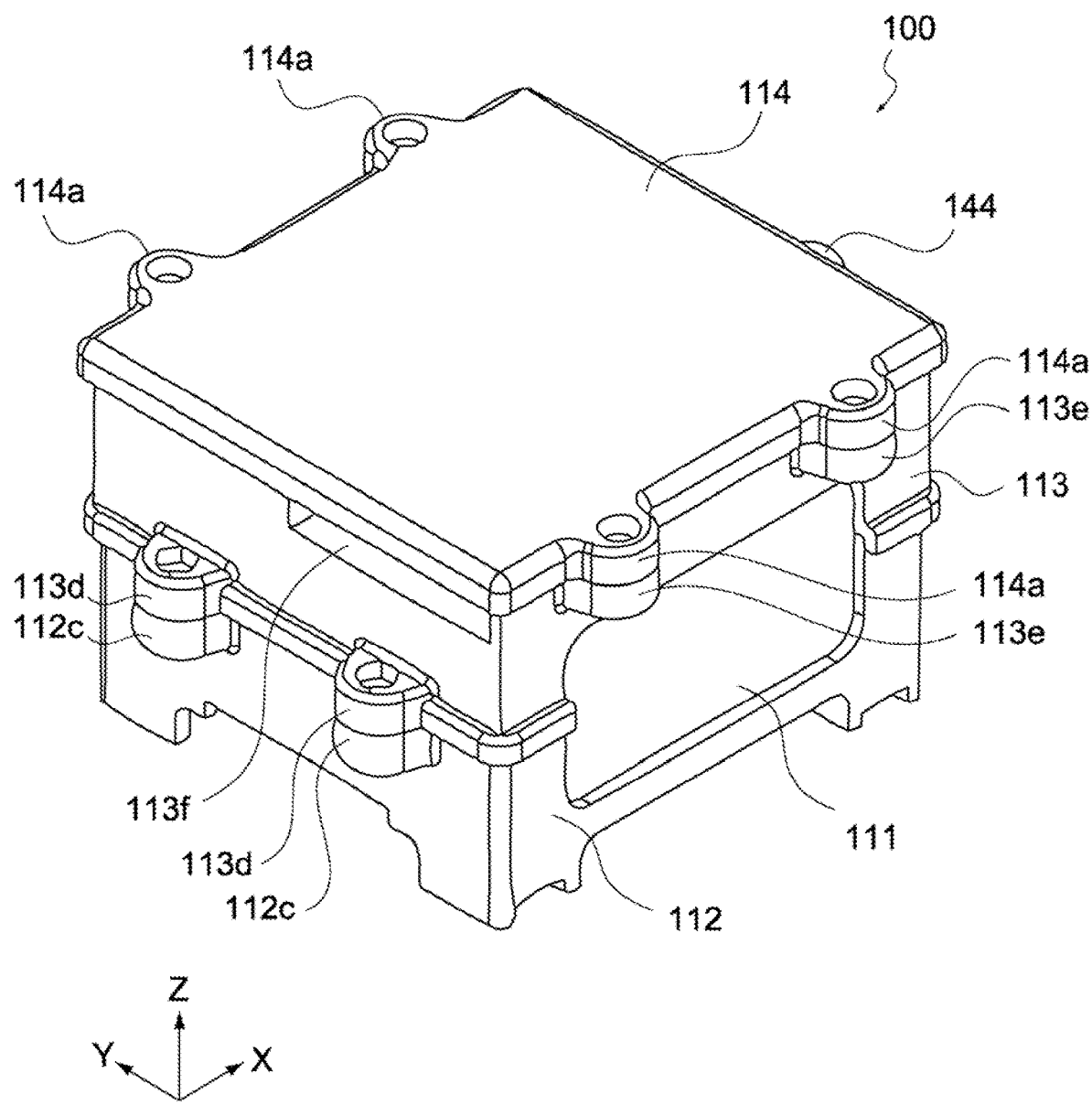
FIG. 1 is a perspective view of an odor detection device in accordance with an embodiment of the present disclosure.
Figure 2:
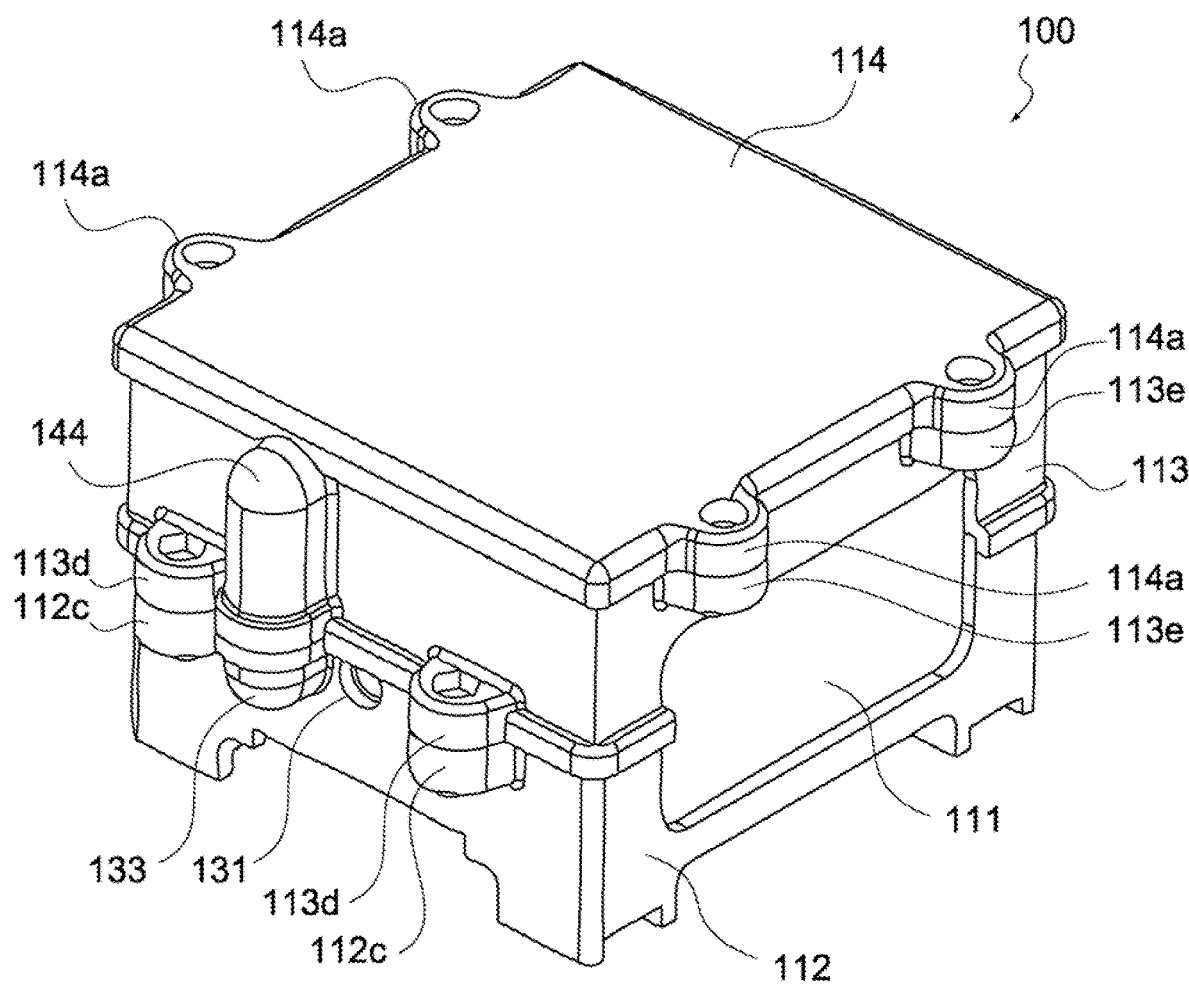
FIG. 2 is a perspective view of the odor detection device viewed from another direction.
Figure 3:
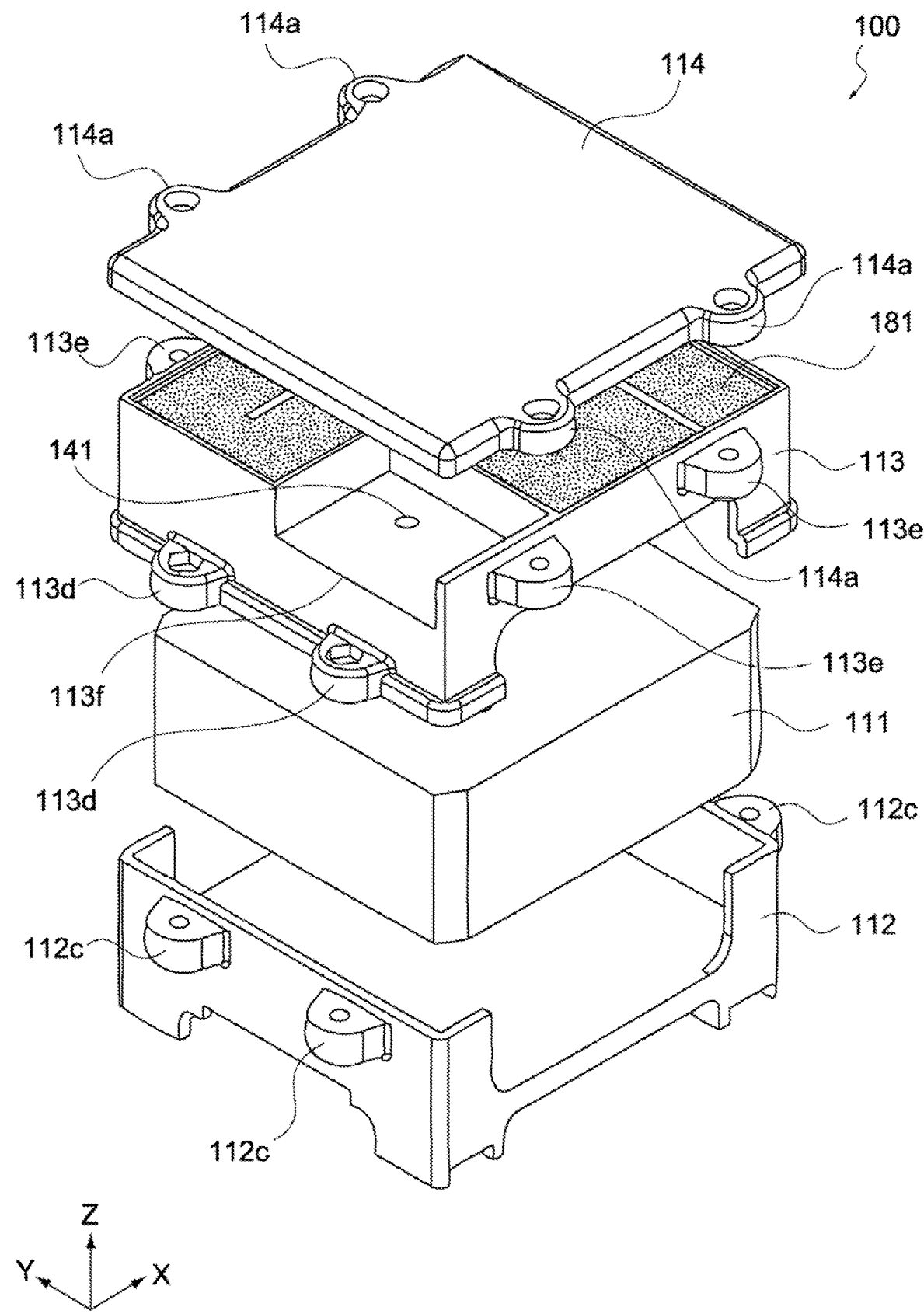
FIG. 3 is an exploded perspective view of the odor detection device.
Figure 4:
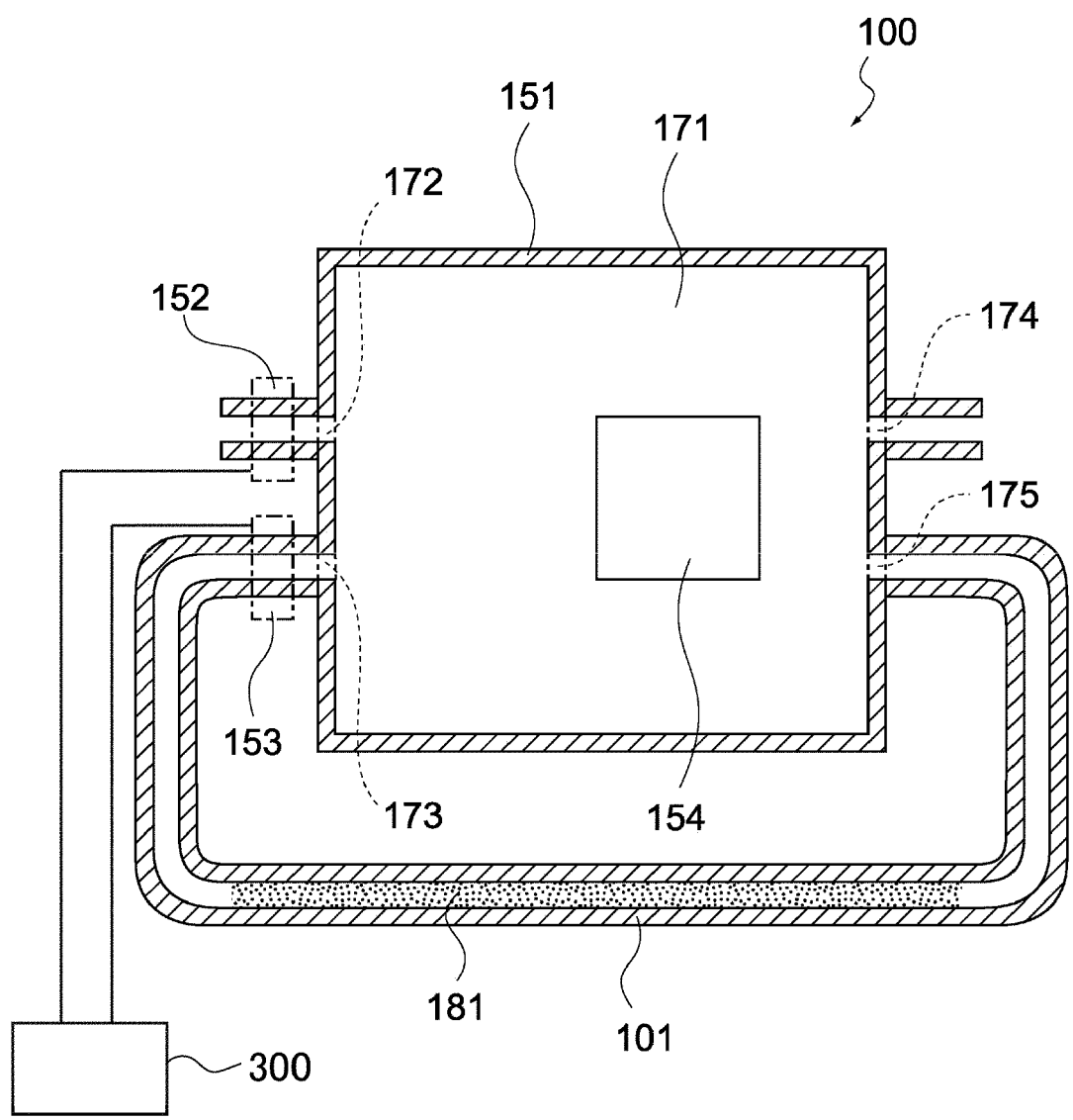
FIG. 4 is a schematic view illustrating an overall structure of the odor detection device.

FIG. 1 is a perspective view of an odor detection device 100 in accordance with an embodiment, and FIG. 2 is a perspective view of the odor detection device 100 viewed from a direction different from that of FIG. 1. FIG. 3 is an exploded perspective view of the odor detection device 100, and FIG. 4 is a schematic view illustrating an overall structure of the odor detection device 100. In each drawing, three directions orthogonal to each other are defined as an X-axis direction, a Y-axis direction, and a Z-axis direction.

First, a schematic view, FIG. 4, will be described. As illustrated in FIG. 4, the odor detection device 100 includes a sensor chamber 171, sensor elements 154, a flow channel 101, a first pump 152, a second pump 153, and a filter 181. The sensor chamber 171 is provided with a first inlet 172, a second inlet 173, a first outlet 174, and a second outlet 175, and houses the sensor elements 154.

The second outlet 175 is connected to the second inlet 173 by the flow channel 101. The first pump 152 causes a measurement target gas to flow into the sensor chamber 171 from the first inlet 172 and to be discharged from the first outlet 174. On the other hand, the second pump 153 causes a gas to flow from the sensor chamber 171 into the flow channel 101 through the second outlet 175, and causes the gas to flow from the flow channel 101 into the sensor chamber 171 through the second inlet 173. The filter 181 is disposed in the flow channel 101.

Therefore, the measurement target gas is measured by the sensor elements 154 in the sensor chamber 171, is then cleaned by the filter 181 disposed in the flow channel 101, and flows into the sensor chamber 171 again. In this manner, when cleaning is performed, the gas (air) inside the sensor chamber 171 can be circulated a plurality of times, and the filter size can be reduced.

In order to clean the gas from the outside, it is necessary to clean the impurities at a time, which would increase the volume of the filter. However, when the gas is circulated, the gas passes through the same filter 181 many times, and thus the volume of the filter 181 can be reduced and the filter size can be reduced accordingly, and as a result, the size of the odor detection device 100 can be reduced. Since the degree of cleanliness increases every time the cleaning gas is circulated, the sensor can be refreshed with the cleaning gas having a high degree of cleanliness. Therefore, the life of the sensor element 154 can be extended. The cleaning gas is required to be free of extra components and have a stable degree of cleanliness. This circulation allows a stable gas to be supplied.

Figure 5:
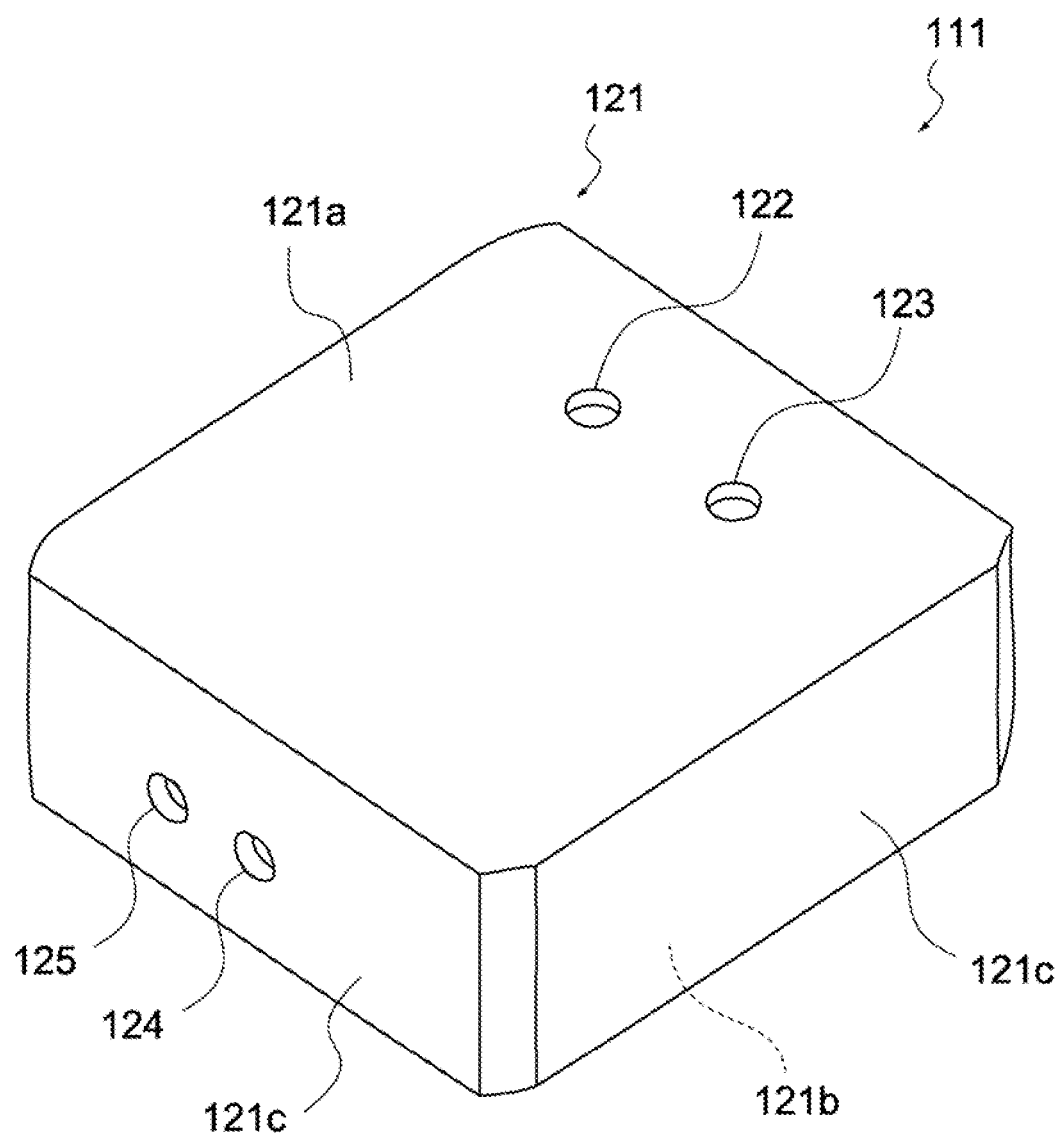
FIG. 5 is a perspective view of a sensor unit included in the odor detection device.

These configurations are formed by a sensor unit 111, a lower case 112, an upper case 113, and a lid 114 illustrated in FIG. 3. The sensor unit 111 incorporates a sensor module 150. FIG. 5 is a perspective view of the sensor unit 111, and FIG. 6 is a perspective view of the sensor module 150.

The sensor unit 111 includes a sensor chassis 121. As illustrated in FIG. 5, the sensor chassis 121 is a hollow box-shaped member that houses the sensor module 150. The sensor chassis 121 has a rectangular parallelepiped shape and has an upper surface 121*a*, a lower surface 121*b*, and side surfaces 121*c*. The upper surface 121*a* and the lower surface 121*b* are located opposite to each other. In the case of a rectangular parallelepiped shape, the side surfaces 121*c* are four surfaces.

The upper surface 121*a* has a first opening 122 and a second opening 123. One of the side surfaces 121*c* has a third opening 124 and a fourth opening 125. A gas enters through the first opening 122 and the second opening 123, and is discharged through the third opening 124 and the fourth opening 125. Of the side surfaces 121*c*, the surface having the third opening 124 and the fourth opening 125 and the surface opposite to that surface may be made of aluminum, and other surfaces may be made of resin. The upper surface 121*a* and the lower surface 121*b* may be made of aluminum.

Figure 6:
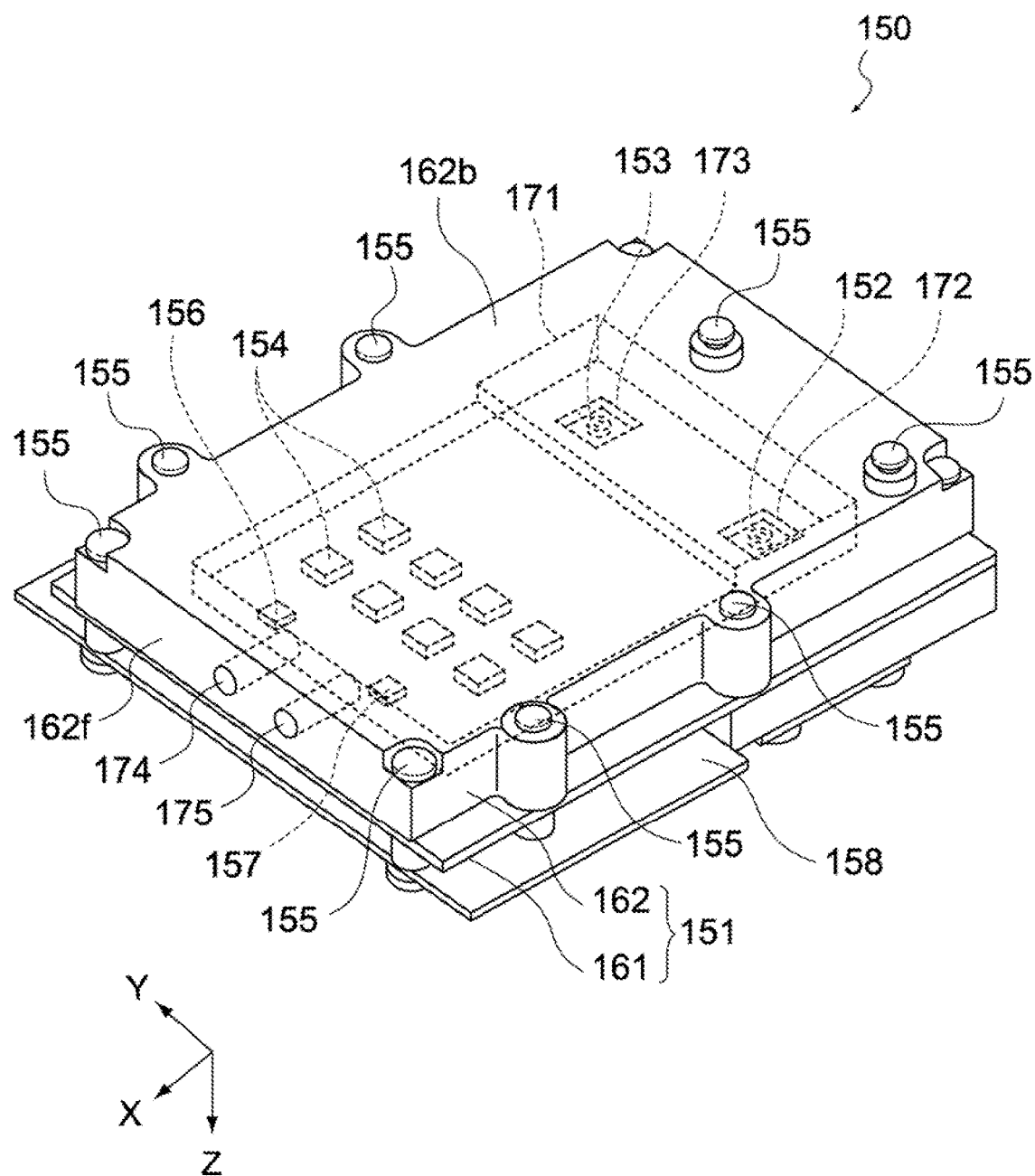
FIG. 6 is a perspective view of a sensor module included in the sensor unit.
Figure 7:
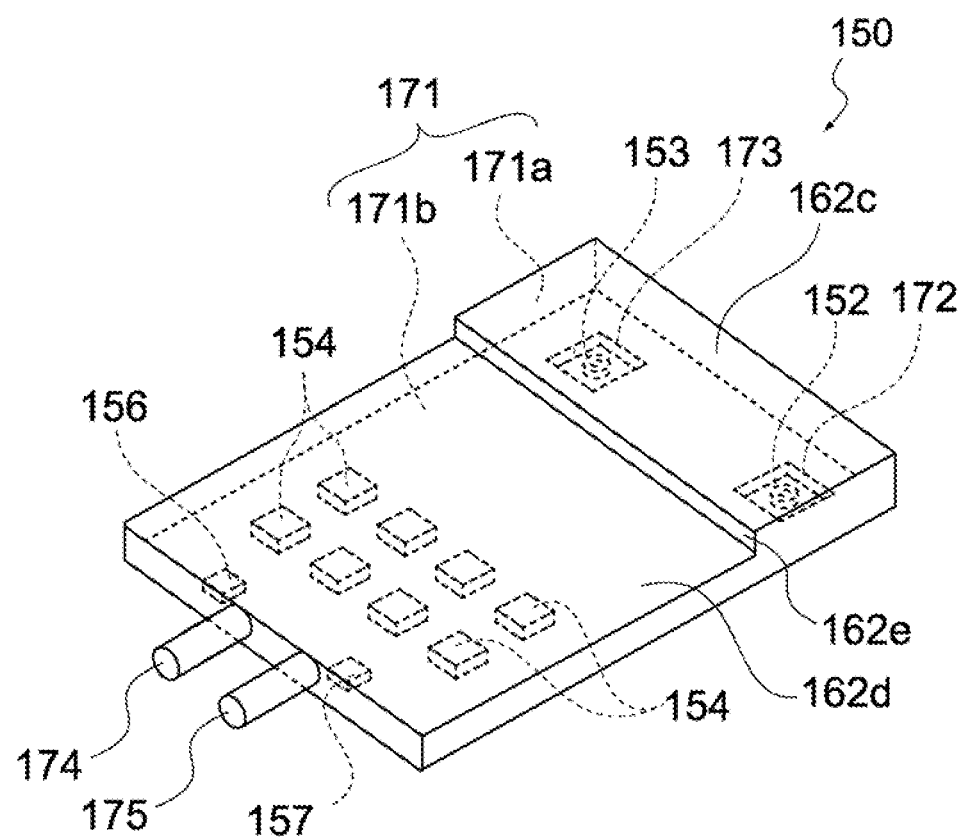
FIG. 7 is a partially transparent perspective view of the sensor module.
Figure 8:
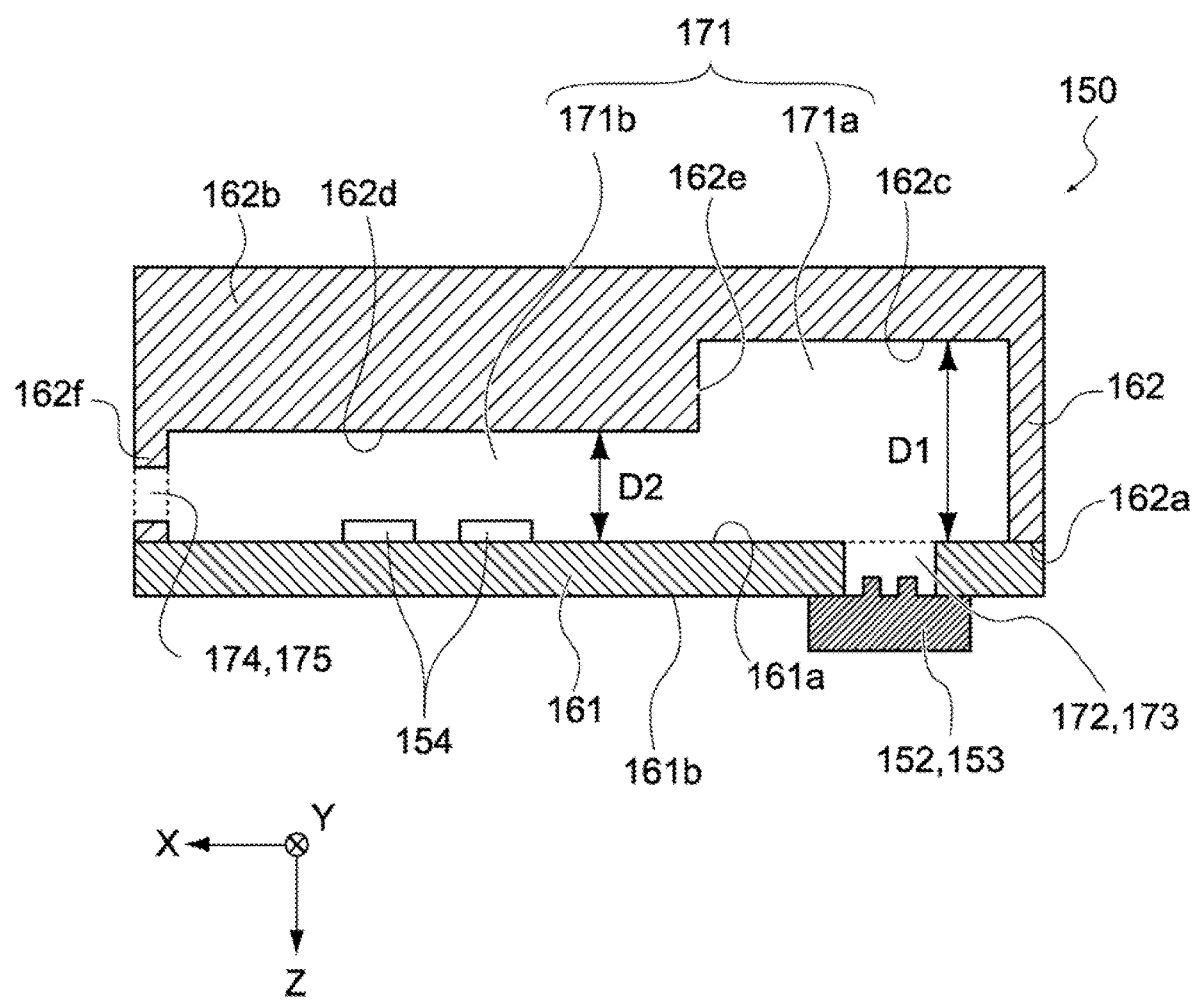
FIG. 8 is a cross-sectional view of the sensor module.
Figure 9:
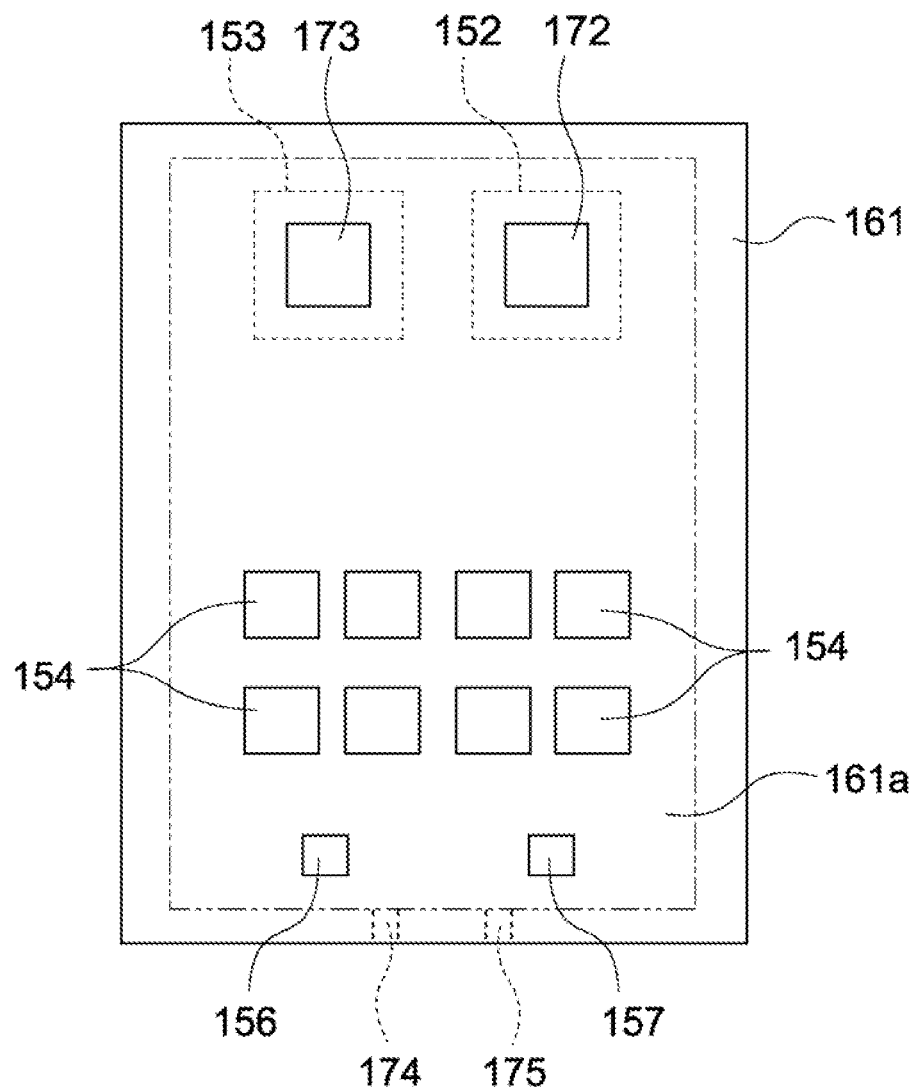
FIG. 9 is a plan view of a wiring substrate included in the sensor module.

As illustrated in FIG. 6, the sensor module 150 includes a case 151, the first pump 152, the second pump 153, and the sensor elements 154. FIG. 7 to FIG. 9 illustrate the internal structure of the sensor module 150. FIG. 7 is a transparent perspective view of the case 151, FIG. 8 is a cross-sectional view of the sensor module 150, and FIG. 9 is a plan view of the inside of a wiring substrate 161. As illustrated in FIG. 8, the case 151 includes the wiring substrate 161 and a case body 162, and is structured by combining these components.

As illustrated in FIG. 8, the wiring substrate 161 has a first main surface 161*a* on which the sensor elements 154 are mounted, and a second main surface 161*b* opposite to the first main surface 161*a*. The first main surface 161*a* is an inner main surface facing the case body 162, and the inner surface of the case body 162 and the first main surface 161a of the wiring substrate 161 form an internal space. The second main surface 161b is an outer main surface.

The wiring substrate 161 is a rectangular substrate having a long side in the X-axis direction, and is a double-sided wiring substrate having wiring layers formed on the first main surface 161a and the second main surface 161b, respectively. The wiring substrate 161 is typically a glass epoxy substrate, but other rigid substrates such as a ceramic substrate and a metal substrate may be employed.

The case body 162 has a substantially rectangular parallelepiped shape with one surface removed to form an opening. This opening is opened on the side in contact with the wiring substrate 161, and an opening end 162a is provided. In the present embodiment, one surface parallel to the X-Y plane is removed to form an opening. The opening end 162a, which is the lower end of the sidewall forming the opening of the case body 162, is bonded and fixed to a peripheral portion of the first main surface 161a of the wiring substrate 161 so as to maintain hermeticity. The case body 162 has a bottom portion 162b (space wall 162b), and the bottom portion 162b is located at a position facing the first main surface 161a of the wiring substrate 161. Thus, the sensor chamber 171 is formed between the wiring substrate 161 and the case body 162.

In the present embodiment, the case body 162 is fixed to the wiring substrate 161 by a plurality of screws 155 (see FIG. 6). A sealing member (such as a packing) (not illustrated) is disposed between the first main surface 161a of the wiring substrate 161 and the opening end 162a of the case body 162 to ensure hermeticity between the wiring substrate 161 and the case body 162. The case body 162 is, for example, an injection molded body of a synthetic resin material. The type of the resin material is not particularly limited, and is, for example, polytetrafluoroethylene.

The case 151 (see FIG. 6) includes the sensor chamber 171, the first inlet 172, the second inlet 173, the first outlet 174, and the second outlet 175. The first inlet 172 and the second inlet 173 are provided in the wiring substrate 161, and the first outlet 174 and the second outlet 175 are provided in the case body 162. The case 151 has no openings other than the first inlet 172, the second inlet 173, the first outlet 174, and the second outlet 175.

The sensor chamber 171 (see FIG. 8) has a first chamber 171a and a second chamber 171b. The first chamber 171a is formed between the first main surface 161a and a bottom surface 162c, and the second chamber 171b is formed between the first main surface 161a and a bottom surface 162d. The first chamber 171a is communicated with the first inlet 172 and the second inlet 173, and the second chamber 171b is communicated with the first outlet 174 and the second outlet 175.

As illustrated in FIG. 8, when a distance between the first main surface 161a and the bottom surface 162c in the first chamber 171a is defined as a distance D1, and a distance between the first main surface 161a and the bottom surface 162d in the second chamber 171b is defined as a distance D2, the distance D1 can be larger than the distance D2. Thus, a step portion 162e is formed at the boundary between the first chamber 171a and the second chamber 171b.

The step portion 162e is a wall surface extending along the Y-axis direction between the first inlet 172 and the first outlet 174 and between the second inlet 173 and the second outlet 175, and functions as a throttle to restrict the flow path of the gas flowing from the first chamber 171a to the second chamber 171b.

Specifically, the gas flowing into the first chamber 171a from the first inlet 172 or the second inlet 173 is isotopically diffused in the first chamber 171a in a turbulent state as a result of the restriction of the flow into the second chamber 171b by the step portion 162e. Further, the gas flowing into the first chamber 171a flows into the second chamber 171b in a laminar state due to the throttle formed by the step portion 162e.

This allows the gas flowing into the first chamber 171a to be uniformly supplied throughout the entire area of the second chamber 171b, regardless of the positions of the first inlet 172 and the second inlet 173. In addition, since the first inlet 172 and the second inlet 173 are provided in the wiring substrate 161 so as to face the bottom portion (bottom surface 162c) of the first chamber 171a, it is possible to further enhance the gas diffusion effect in the first chamber 171a.

Note that the step portion 162e is not necessarily provided, and the bottom surface 162c and the bottom surface 162d may be on the same plane. In addition, even when the bottom surface 162c and the bottom surface 162d are on the same plane, a wall extending from the bottom portion 162b toward the first main surface 161a may be provided between the bottom surface 162c and the bottom surface 162d so as to have a throttle function equivalent to that of the step portion 162e.

Each of the first inlet 172 and the second inlet 173 is a through hole provided in the wiring substrate 161. The shapes of the first inlet 172 and the second inlet 173 are not limited to the rectangular shape illustrated in the figure, and may be a circular shape. As illustrated in FIG. 9, the first inlet 172 and the second inlet 173 may be formed in a region on one side (−X-axis direction side) of the wiring substrate 161 so as to be adjacent to each other in the Y-axis direction.

Each of the first outlet 174 and the second outlet 175 is a through hole provided in the case body 162. The shapes of the first outlet 174 and the second outlet 175 are not limited to the illustrated circular shape, and may be a rectangular shape or the like. The sizes of the first outlet 174 and the second outlet 175 are preferably approximately the same. As illustrated in FIG. 9, the first outlet 174 and the second outlet 175 may be formed on the side wall at the other side (+X-axis direction side) of the case body 162 so as to be adjacent to each other in the Y-axis direction.

The positional relationship among the first inlet 172, the second inlet 173, the first outlet 174, and the second outlet 175 is not particularly limited, but the first inlet 172 and the first outlet 174 are preferably located opposite to each other across the sensor elements 154 in the sensor chamber 171. Further, the second inlet 173 and the second outlet 175 are also preferably located opposite to each other across the sensor elements 154 in the sensor chamber 171. Specifically, as illustrated in FIG. 8, the first inlet 172 and the second inlet 173 may be disposed close to one end of the wiring substrate 161 in the longitudinal direction (X-axis direction), and the first outlet 174 and the second outlet 175 may be provided on a sidewall 162f bonded to the other end of the wiring substrate 161 in the longitudinal direction (X-axis direction). Since the first inlet 172 and the second inlet 173 are located opposite to the first outlet 174 and the second outlet 175 across the sensor elements 154, respectively, the gas can efficiently flow into the sensor elements 154.

The first pump 152 is provided in the first inlet 172, and delivers the gas from the first inlet 172 into the sensor chamber 171. The second pump 153 is provided in the second inlet 173, and delivers the gas from the second inlet 173 into the sensor chamber 171. The first pump 152 and the second pump 153 may be disposed on the second main surface 161b of the wiring substrate 161. The types of the first pump 152 and the second pump 153 are not particularly limited, but a pump that hardly allows gas to pass therethrough while its operation is stopped is preferable, and a diaphragm pump is particularly preferable. Note that the odor detection device 100 may include a device capable of delivering gas instead of the first pump 152. For example, a fan may be provided. In addition, the odor detection device 100 may include a device capable of delivering gas instead of the second pump 153. For example, a fan may be provided.

The sensor element 154 detects an odor component. For example, a quartzcrystalmicrobalance (QCM) sensor can be used as the sensor element 154. The QCM sensor has a structure in which a sensitive film for adsorbing a detection target component is provided on an electrode surface of a quartz oscillator. When the detection target component is adsorbed on the electrode surface of the quartz oscillator, the resonant frequency varies (decreases) in accordance with the mass of the detection target component. Therefore, a minute variation in mass can be detected. The QCM sensor can detect different components depending on the material of the sensitive film, and the sensor elements 154 can detect different odor components. Note that the sensor elements 154 may be sensors other than the QCM sensors.

The odor component detected by the sensor element 154 is typically a relatively heavy molecule in the air, such as a polymer compound, but is not particularly limited thereto. The odor component detected by the sensor element 154 is not limited to a component that can be sensed by human sense of smell, and may be any chemical species present in a gas.

The sensor module 150 includes eight sensor elements 154, and eight types of odor components can be detected by using different sensitive films of the respective sensor elements 154. Note that the present embodiment is not limited to the example in which one type of odor component is detected by one sensor element 154, and one type of odor component may be detected by a plurality of the sensor elements 154. Further, one sensor element 154 may be configured to be able to detect a plurality of types of odor components. In this case, it is preferable to use a sensitive film having different sensitivity depending on the odor component.

The sensor elements 154 are mounted on the first main surface 161a of the wiring substrate 161 facing the sensor chamber 171. Although an example in which eight sensor elements 154 are arranged in two rows and four columns is illustrated in the present embodiment, the layout is not limited to this. The number of the sensor elements 154 is not limited to eight, and can be freely set in accordance with the number of detection target components, and may be one.

A temperature sensor 156 and a humidity sensor 157 may be mounted on the first main surface 161a of the wiring substrate 161. The region where the temperature sensor 156 and the humidity sensor 157 are mounted is not particularly limited. In the present embodiment, the temperature sensor 156 and the humidity sensor 157 are disposed in any region between the sensor elements 154 and the first outlet 174 and the second outlet 175. When the QCM characteristic of the sensor element 154 has temperature dependence, the output of the sensor element 154 is corrected based on the output of the temperature sensor 156.

Further, the humidity sensor 157 may be used as, for example, a water vapor detection sensor. For example, a thermistor can be applied for the temperature sensor 156, and a QCM sensor provided with a sensitive film having adsorptive properties for water vapor can be applied for the humidity sensor 157.

As illustrated in FIG. 6, a control substrate 158 is provided at the second main surface 161b side of the wiring substrate 161. A power supply circuit and a signal processing circuit are connected to the control substrate 158. The control substrate 158 is electrically connected to the wiring substrate 161, and supplies necessary electric power to each sensor element 154, the first pump 152, the second pump 153, the temperature sensor 156, and the humidity sensor 157 through wiring layers on the wiring substrate 161.

The signal processing circuit detects the presence or absence, type, and amount of the detection target component in the sensor chamber 171 based on the outputs of the sensor elements 154, the temperature sensor 156, and the humidity sensor 157. In addition to the above-described elements or sensors, other electronic components (for example, drive circuits of the first pump 152 and the second pump 153) may be mounted on the control substrate 158.

The sensor module 150 has a configuration described below. The sensor module 150 is housed in the sensor chassis 121 (see FIG. 5) as described above, and is fixed to the sensor chassis 121 so that the wiring substrate 161 is at the upper surface 121a side (a reversed state of that in FIG. 6). Thus, the first inlet 172 is connected to the first opening 122 through the first pump 152, and the second inlet 173 is connected to the second opening 123 through the second pump 153. The first outlet 174 is connected to the third opening 124, and the second outlet 175 is connected to the fourth opening 125.

Figure 10:
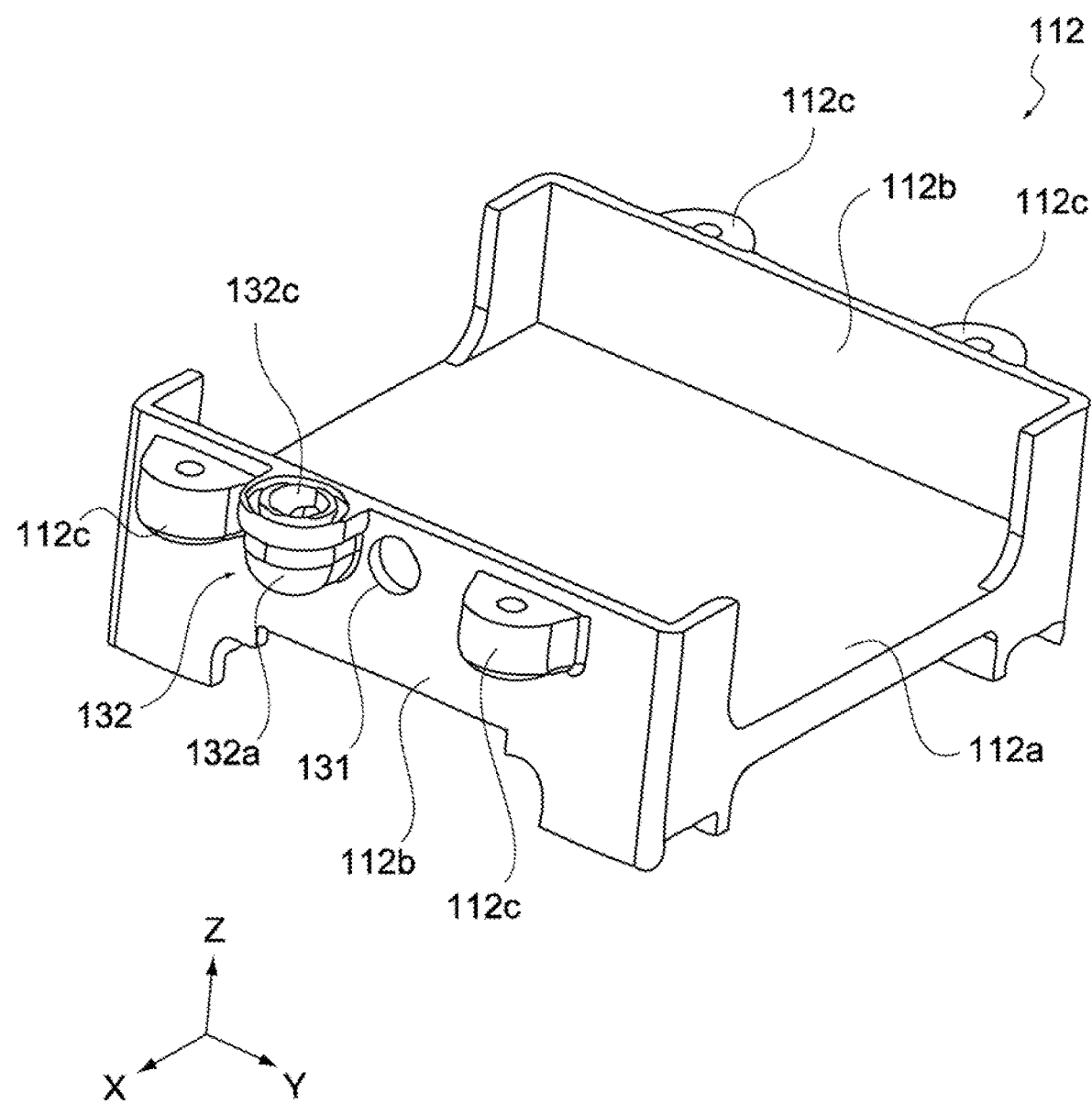
FIG. 10 is a perspective view of a lower case included in the odor detection device.
Figure 11:
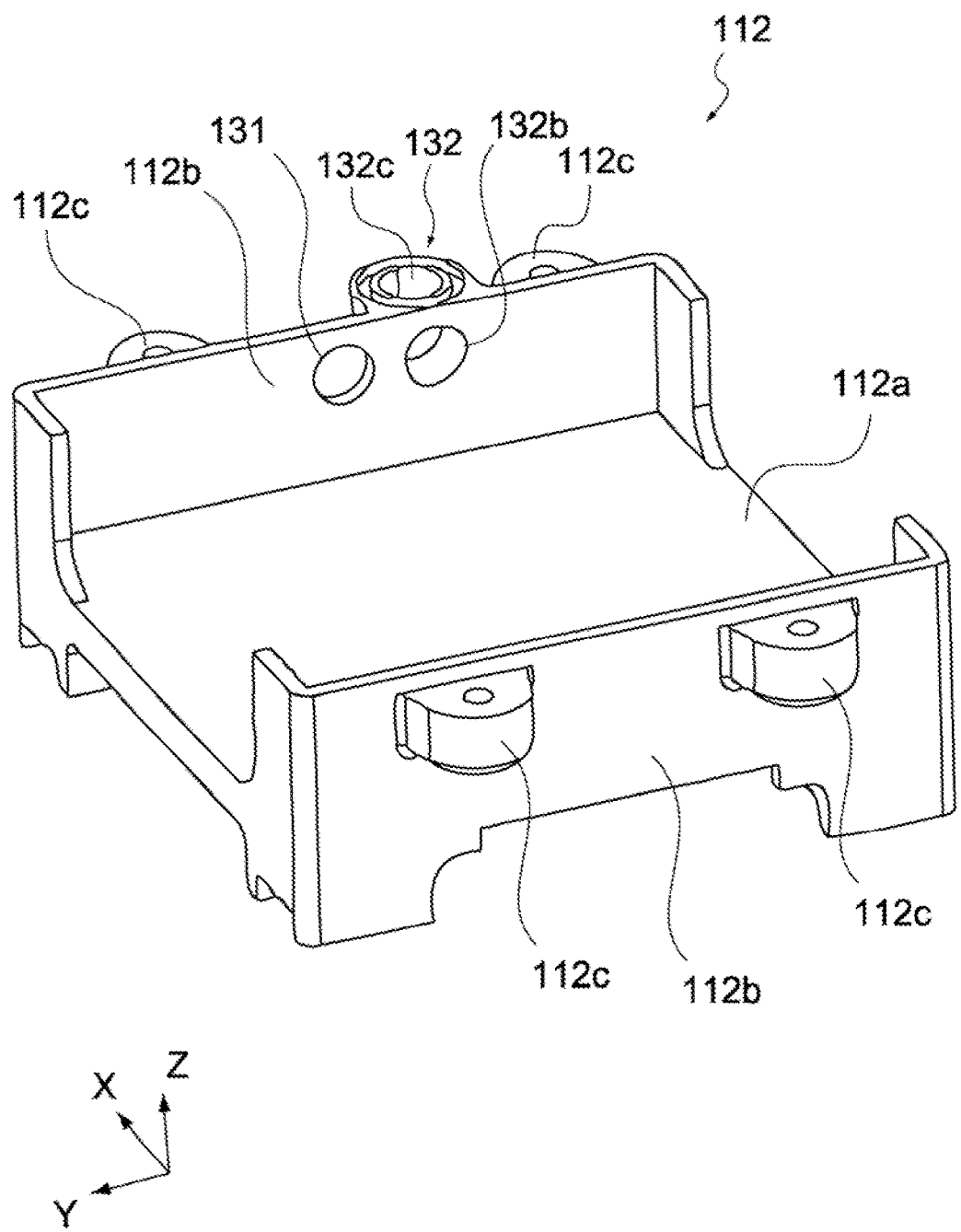
FIG. 11 is a perspective view of the lower case viewed from another direction.

The lower case 112 is a member that holds the sensor unit 111 and is made of, for example, resin. FIG. 10 is a perspective view of the lower case 112, and FIG. 11 is a perspective view of the lower case 112 viewed from another direction. As illustrated in these drawings, the lower case 112 includes a bottom portion 112a, sidewall portions 112b, and fixing portions 112c.

The bottom portion 112a is a flat plate-shaped portion and is in contact with the lower surface 121b (see FIG. 5) of the sensor chassis 121. The sidewall portions 112b are provided in the periphery of the bottom portion 112a so as to be perpendicular to the bottom portion 112a, and are in contact with the side surfaces 121c of the sensor chassis 121. The fixing portions 112c are provided on the sidewall portions 112b and are used for fixing to the upper case 113. Further, the sidewall portion 112b has an opening 131 and a tubular portion 132 adjacent to each other.

The opening 131 is an opening that penetrates through the sidewall portion 112b, and is connected to the third opening 124 (see FIG. 5) when the sensor unit 111 is housed in the lower case 112. The tubular portion 132 has a tube 132a, a tube mouth 132b (see FIG. 11), and a tube mouth 132c (see FIG. 10). The tube 132a connects the tube mouth 132b and the tube mouth 132c. The tube mouth 132b is a tube mouth penetrating through the sidewall portion 112b, and is connected to the fourth opening 125 (see FIG. 5) when the sensor unit 111 is housed in the lower case 112. The tube mouth 132c is a tube mouth facing upward (in the +Z direction) and is connected to a tube mouth of the upper case 113.

Figure 12:
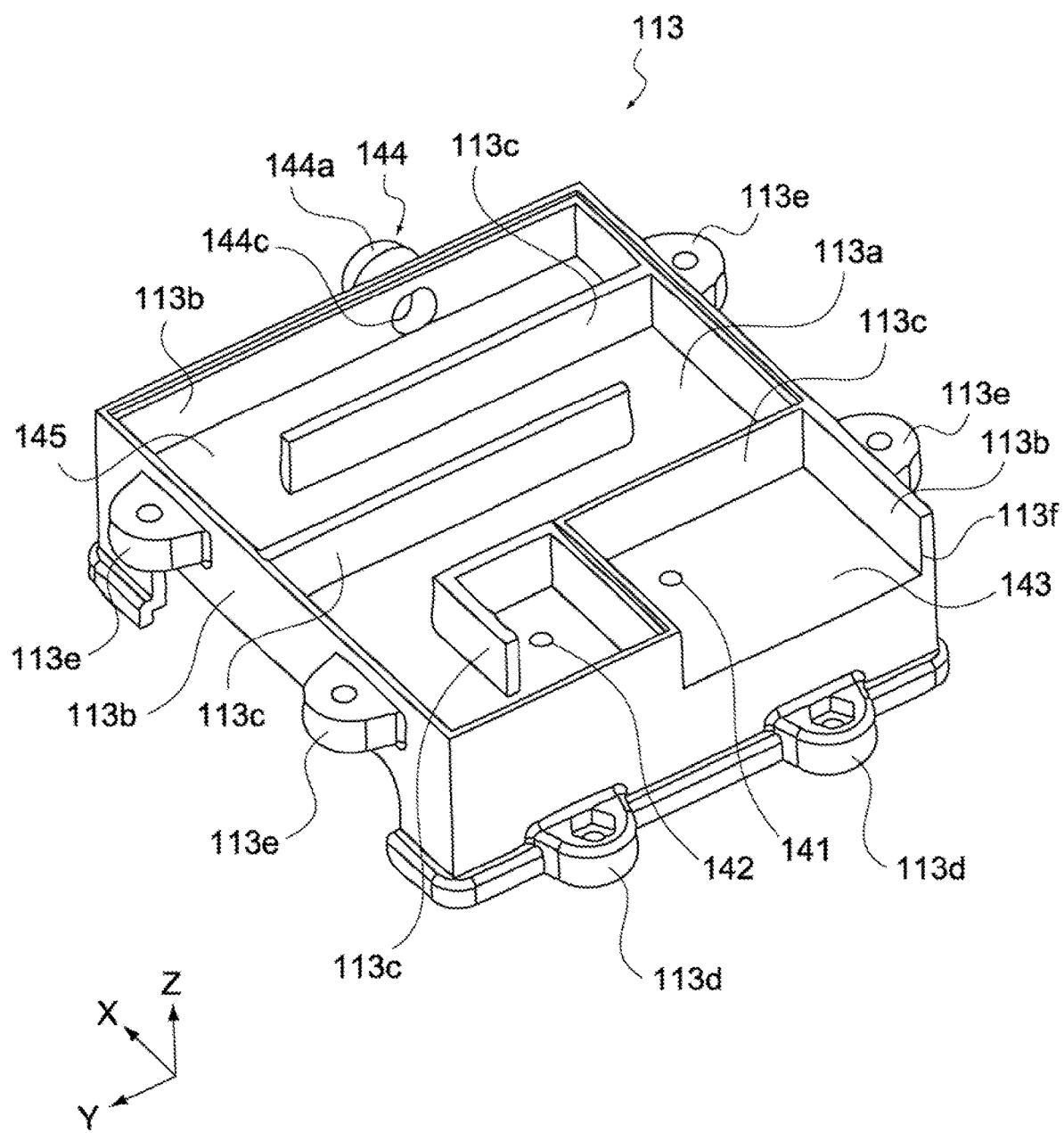
FIG. 12 is a perspective view of an upper case included in the odor detection device.
Figure 13:
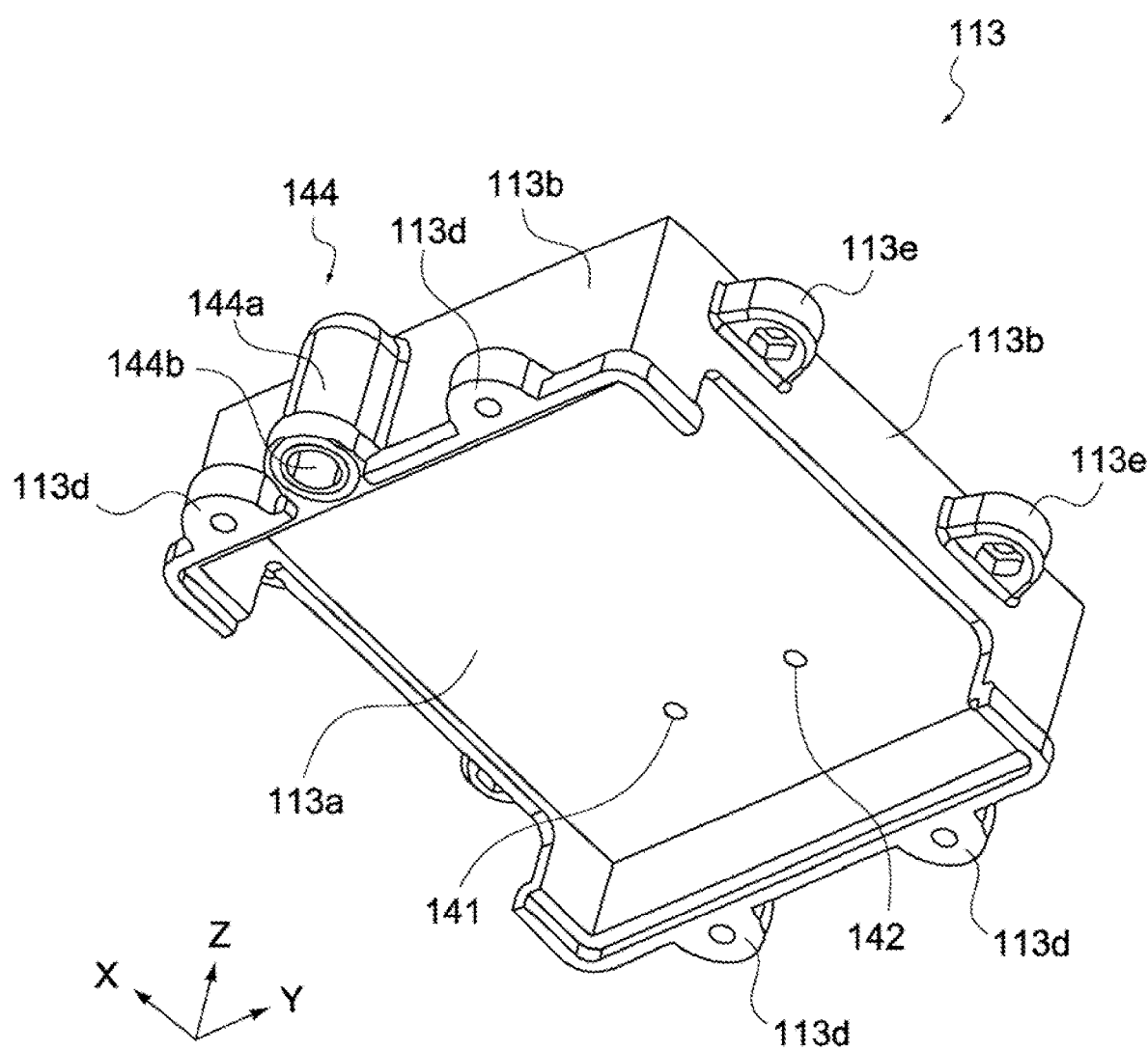
FIG. 13 is a perspective view of the upper case viewed from another direction.

The upper case 113 is a member that is connected to the lower case 112 and forms an introduction space and a flow channel space, and is made of, for example, resin. FIG. 12 is a perspective view of the upper case 113, and FIG. 13 is a perspective view of the upper case 113 viewed from another direction.

As illustrated in these figures, the upper case 113 includes a bottom portion 113a, sidewall portions 113b, inner wall portions 113c, fixing portions 113d, and fixing portions 113e. The bottom portion 113a is a flat plate-shaped portion and is in contact with the upper surface 121a of the sensor chassis 121 (see FIG. 5). The bottom portion 113a has a first opening 141 and a second opening 142. Each of the first opening 141 and the second opening 142 is an opening penetrating through the bottom portion 113a.

When the upper case 113 is attached to the sensor unit 111, the first opening 141 is connected to the first opening 122 of the sensor chassis 121. When the upper case 113 is attached to the sensor unit 111, the second opening 142 is connected to the second opening 123 of the sensor chassis 121.

The sidewall portions 113b are provided in the periphery of the bottom portion 113a so as to be perpendicular to the bottom portion 113a, and are in contact with the side surfaces 121c of the sensor chassis 121. One of the sidewall portions 113b has an opening 113f. The inner wall portions 113c are provided within the bottom portion 113a so as to be perpendicular to the bottom portion 113a, and form an introduction space and a flow channel space, which will be described later, together with the sidewall portions 113b. The fixing portions 113d are provided on the sidewall portions 113b and are used for fixing to the lower case 112. The fixing portions 113e are provided on the sidewall portions 113b and are used for fixing to the lid 114.

Further, one of the sidewall portions 113b has a tubular portion 144. The tubular portion 144 includes a tube 144a, a tube mouth 144b (see FIG. 13), and a tube mouth 144c (see FIG. 12). The tube 144a connects the tube mouth 144b and the tube mouth 144c. The tube mouth 144b is a tube mouth facing downward (–Z direction) and is connected to the tube mouth 132c (see FIG. 10) of the lower case 112. The tube mouth 144c is a tube mouth penetrating through the sidewall portion 113b.

FIG. 12 illustrates an introduction space 143 and a flow channel space 145 formed by the upper case 113. The introduction space 143 is a space defined by the bottom portion 113a, the sidewall portion 113b, the inner wall portion 113c, and the opening 113f, and is communicated with the first opening 141. The flow channel space 145 is a space defined by the bottom portion 113a, the sidewall portions 113b, and the inner wall portions 113c, and is isolated from the introduction space 143 by the inner wall portion 113c. The flow channel space 145 is communicated with the tube mouth 144c and the second opening 142.

The lid 114 is a member that is bonded to the upper case 113 and closes the upper portion of the upper case 113 (see FIG. 3), and is made of resin, for example. The flow channel space 145 is sealed by the lid 114, and the introduction space 143 is sealed except for the opening 113f (see FIG. 12). A sealing member such as a packing may be disposed between the lid 114 and the upper case 113. The lid 114 is a flat plate-shaped member and has fixing portions 114a provided in the periphery thereof. The fixing portions 114a are used for fixing to the upper case 113.

Figure 14:
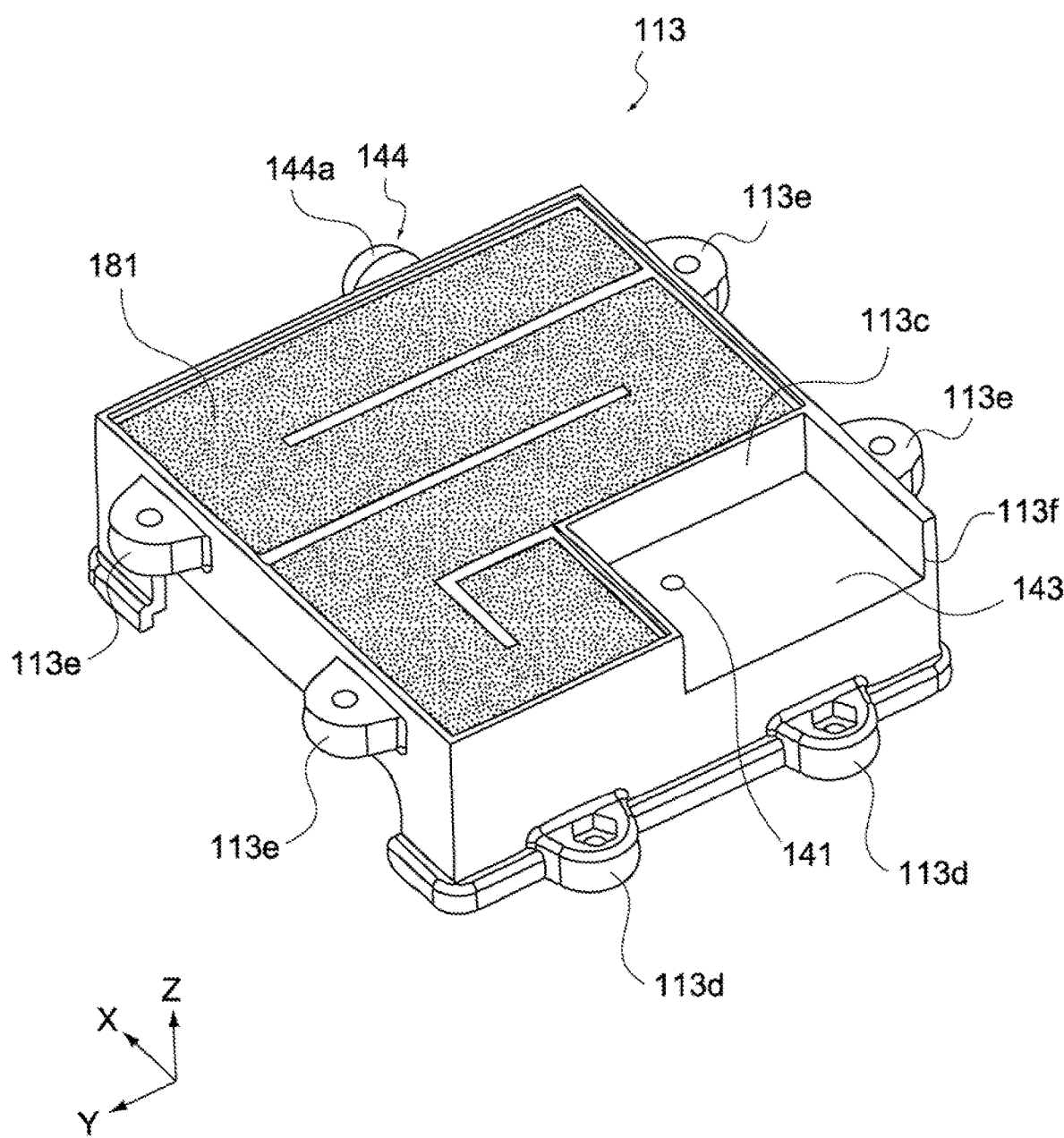
FIG. 14 is a perspective view of the upper case and a filter.

The filter 181 is housed in the flow channel space 145 and removes an odor component from the gas flowing through the flow channel space 145. The filter 181 is a filter capable of removing at least the odor component that is the detection target of each sensor element 154. FIG. 14 is a schematic view illustrating the filter 181 housed in the flow channel space 145. As illustrated in FIG. 14, the filter 181 may be housed in the entire flow channel space 145. In addition, the filter 181 may be housed in only a part of the flow channel space 145, but preferably occupies most of the flow channel space 145.

[Flow Channel]

Figure 15:
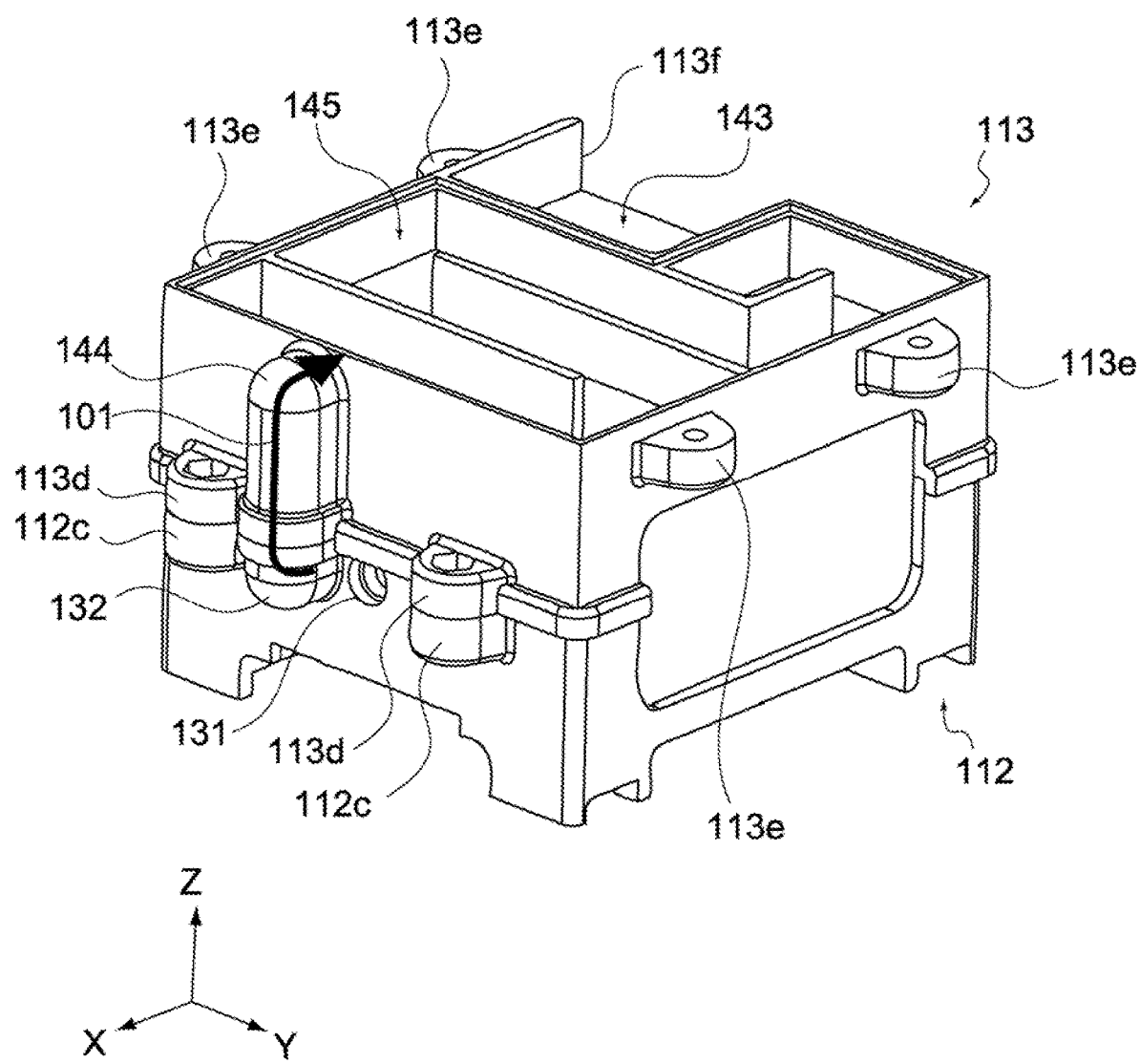
FIG. 15 is a perspective view illustrating a circulation flow path included in the odor detection device.

In the odor detection device 100, the flow channel 101 (see FIG. 4) is formed by the tubular portion 132 of the lower case 112, the tubular portion 144 and the flow channel space 145 of the upper case 113. FIG. 15 is a schematic view illustrating a part of the flow channel 101. As illustrated in the drawing, the tubular portion 132 of the lower case 112 and the tubular portion 144 of the upper case 113 are joined to each other, and the tube mouth 132b (see FIG. 11) and the tube mouth 144c (see FIG. 12) are communicated with each other.

Figure 16:
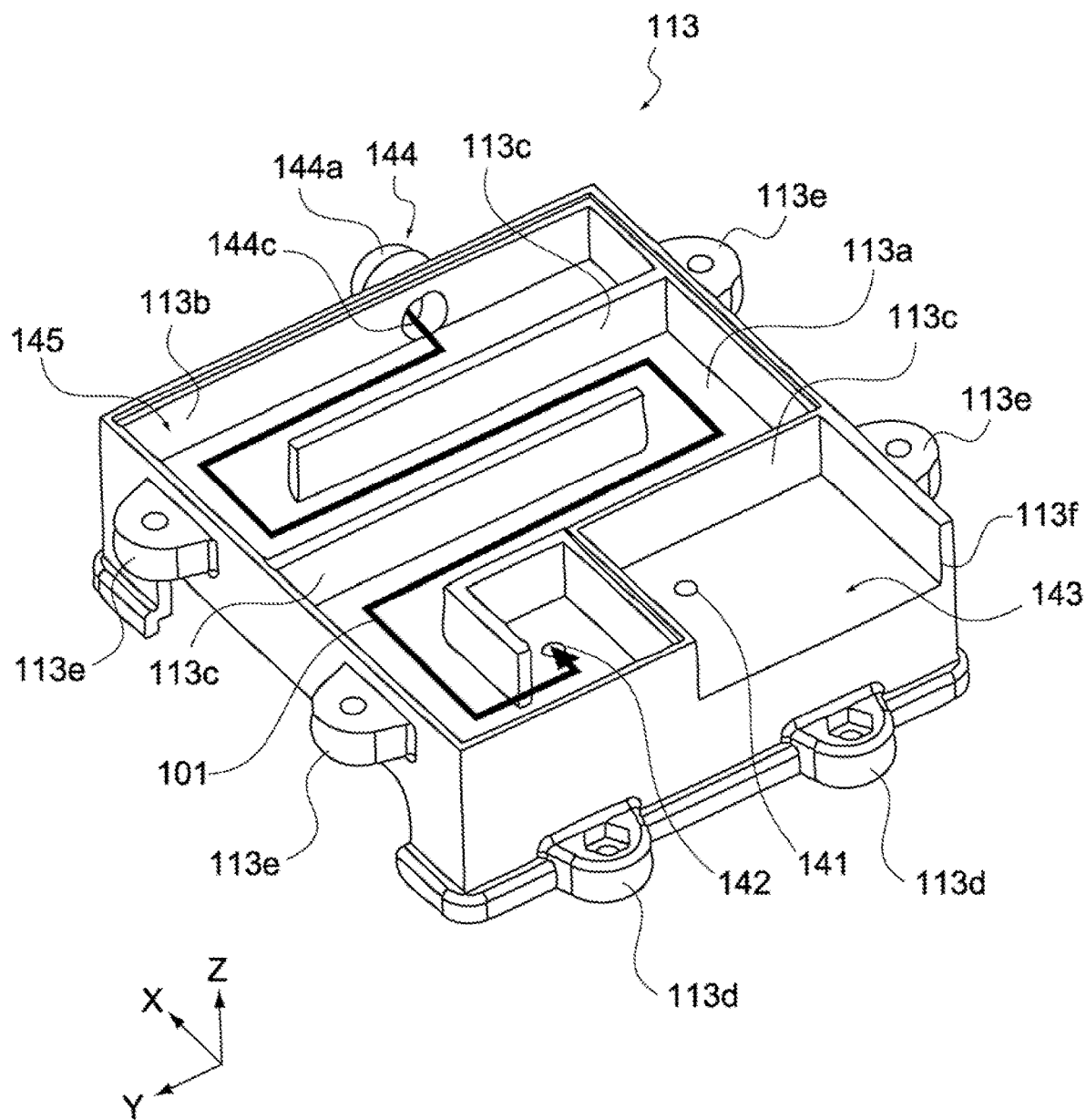
FIG. 16 is a perspective view illustrating the circulation flow path included in the odor detection device.

Accordingly, formed is the flow channel 101 (see FIG. 4) from the second outlet 175 (see FIG. 7) to the second inlet 173 via the tubular portion 132, the tubular portion 144, and the flow channel space 145. FIG. 16 is a perspective view illustrating the flow channel 101 in the flow channel space 145, and FIG. 17 is a plan view illustrating the shape of the flow channel 101 in the flow channel space 145.

Figure 17:
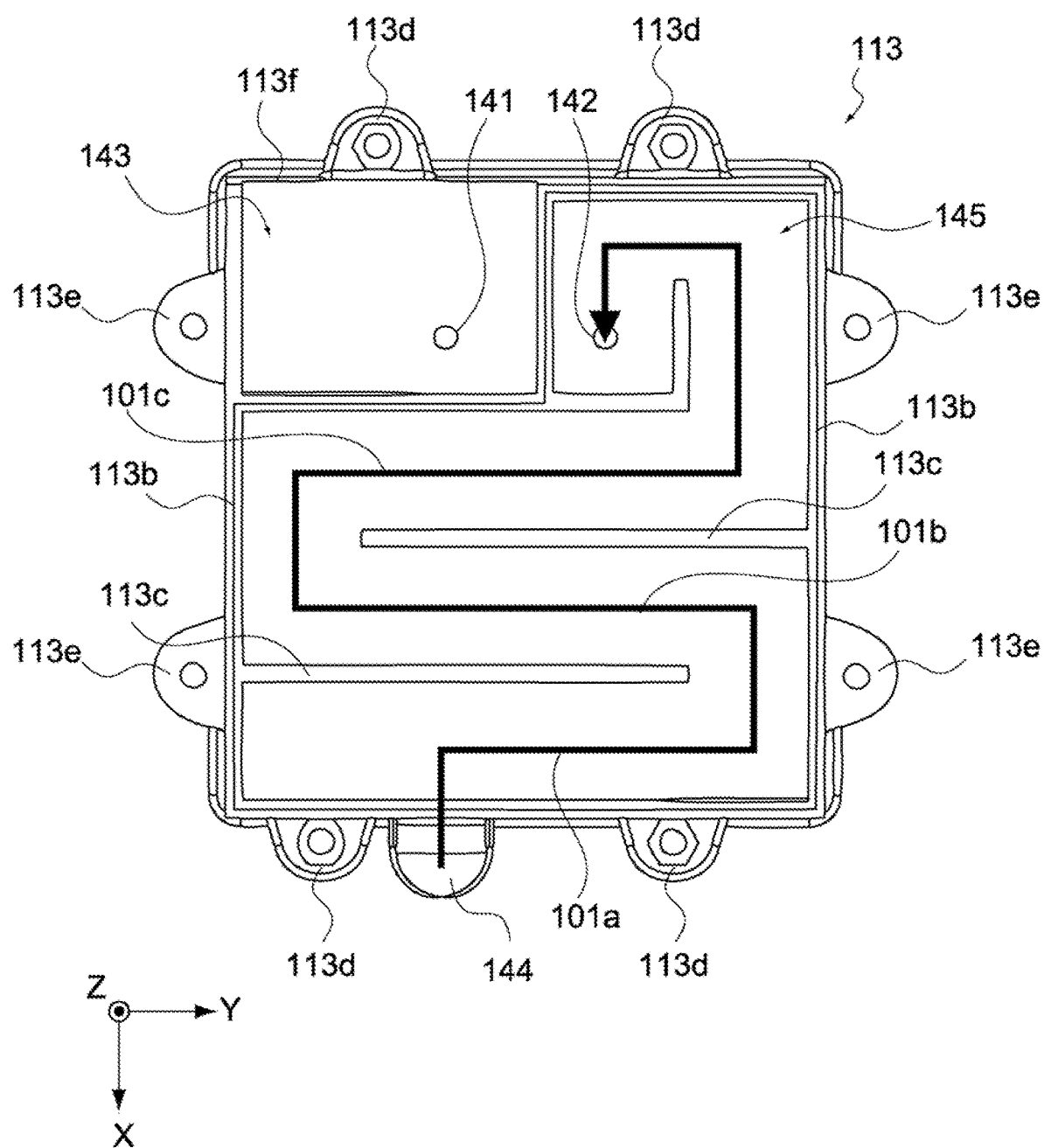
FIG. 17 is a plan view illustrating the circulation flow path included in the odor detection device.
Figure 18:
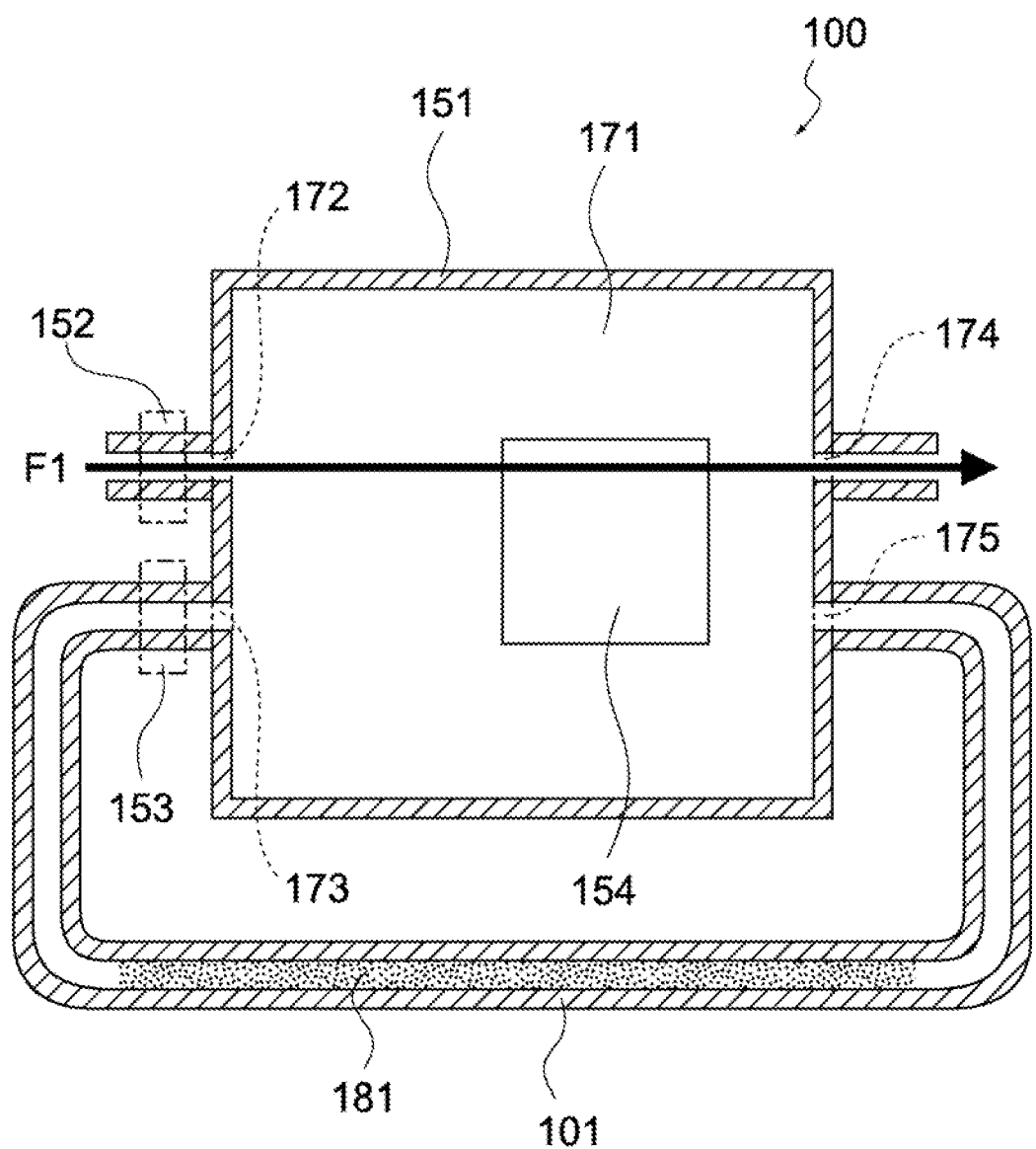
FIG. 18 is a schematic view illustrating a detection flow of the odor detection device.
Figure 19:
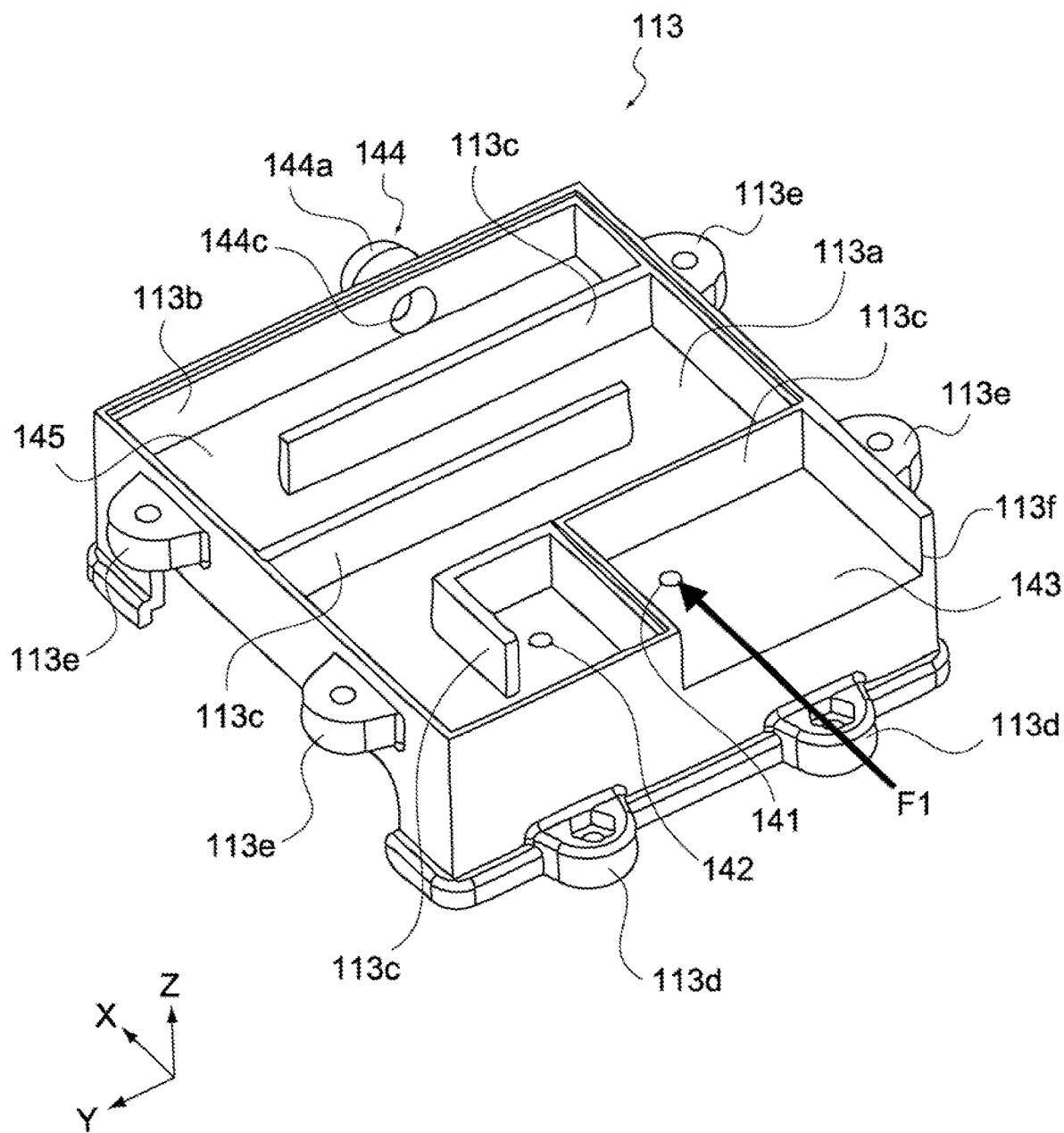
FIG. 19 is a schematic view illustrating the detection flow in the upper case.
Figure 20:
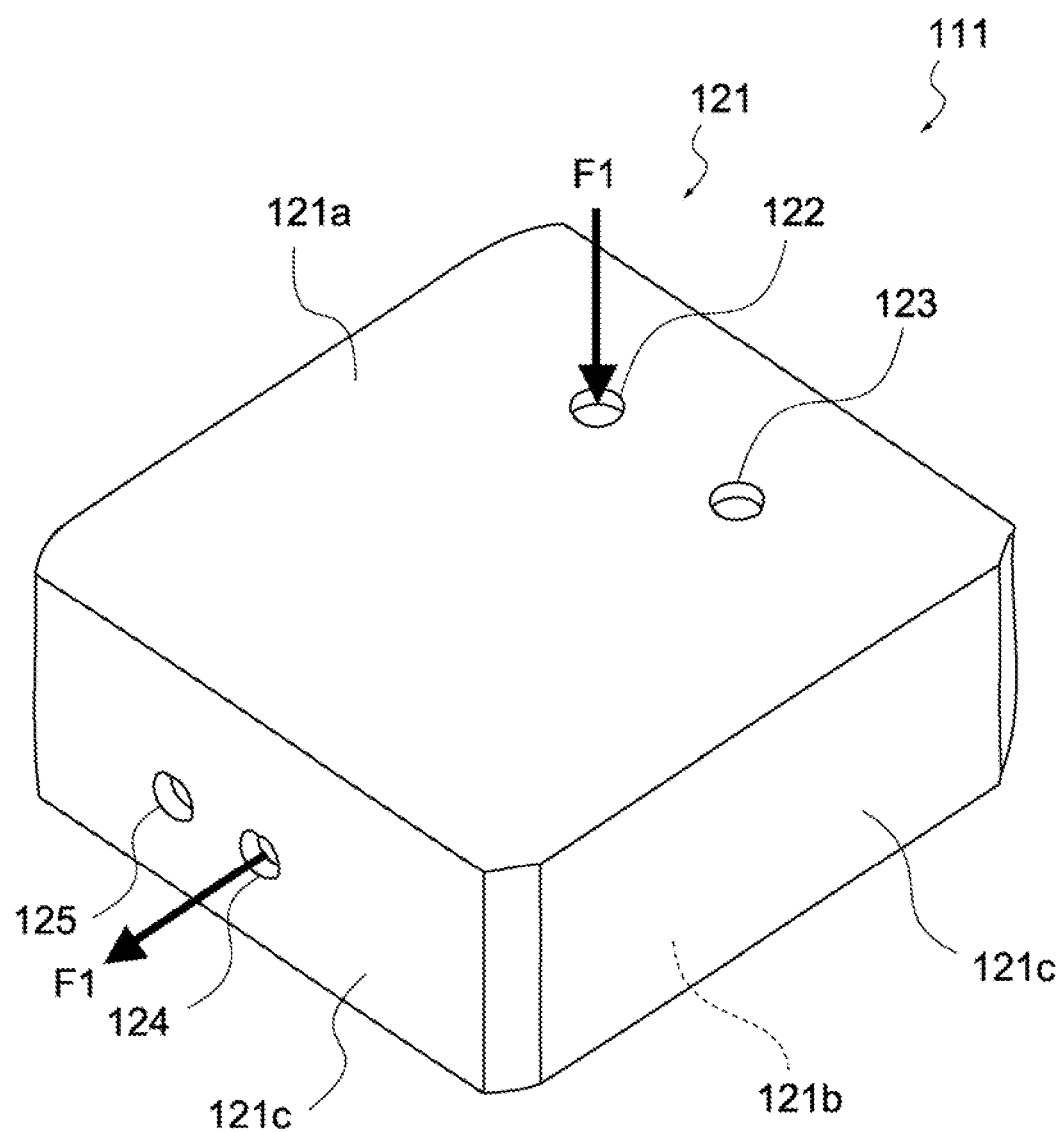
FIG. 20 is a schematic view illustrating the detection flow in an upper sensor unit.
Figure 20:
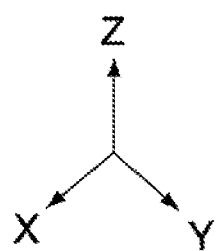
Figure 21:
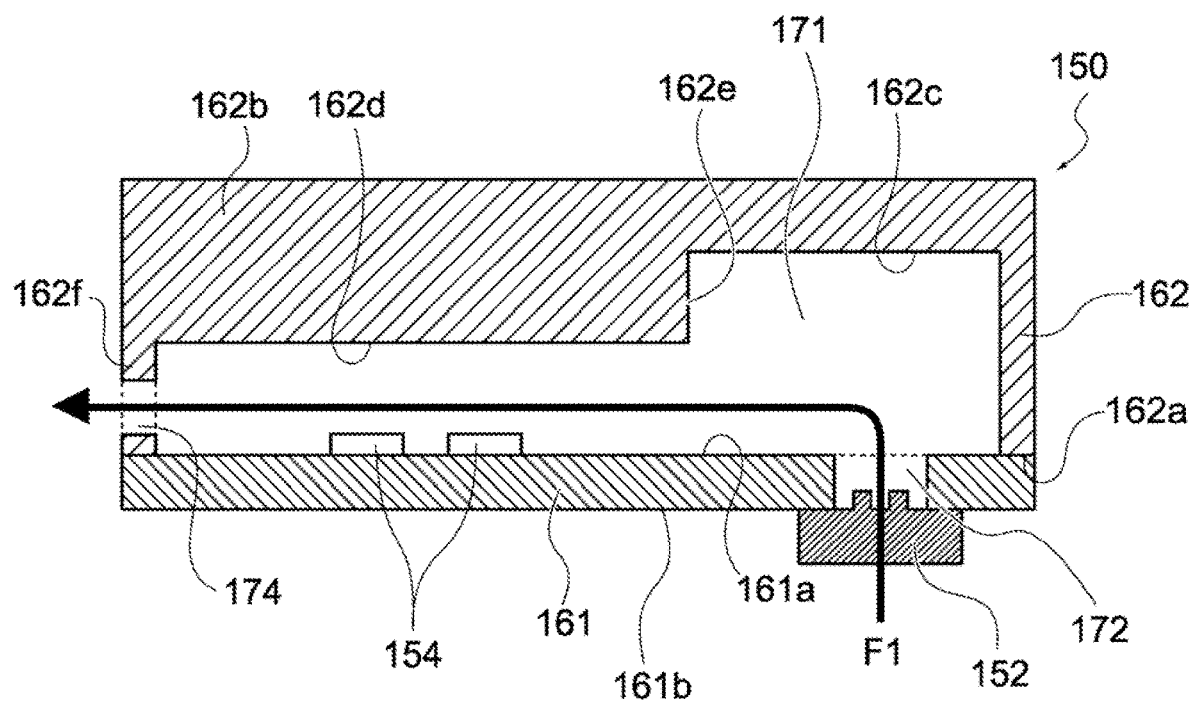
FIG. 21 is a schematic view illustrating the detection flow in the sensor module.
Figure 21:
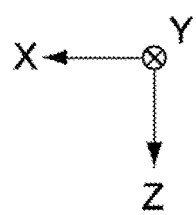
Figure 22:
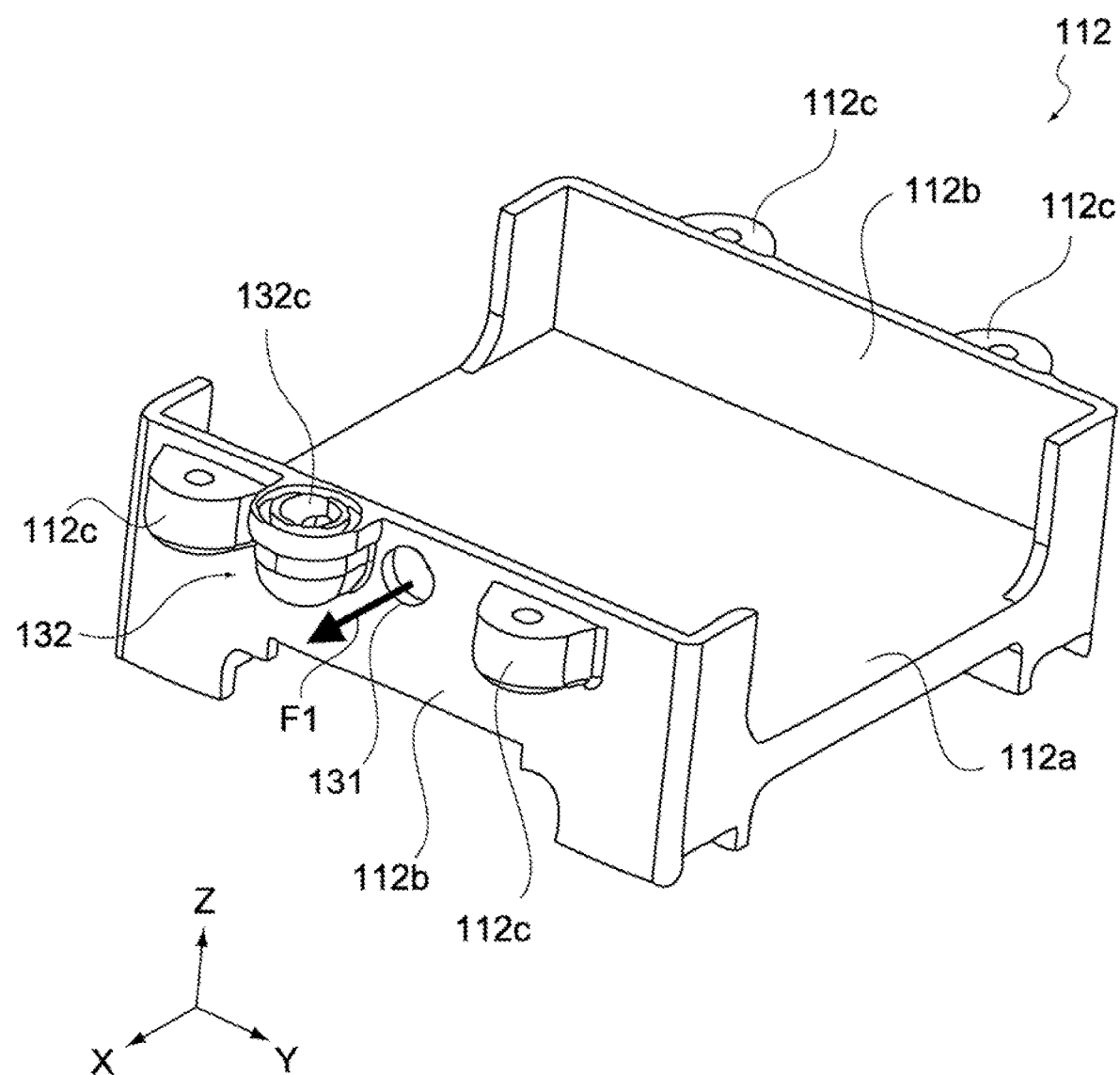
FIG. 22 is a schematic view illustrating the detection flow in the lower case.

As illustrated in FIG. 17, the flow channel 101 includes a first portion 101a, a second portion 101b, and a third portion 101c in the flow channel space 145. The first portion 101a extends in one direction (+Y-axis direction) parallel to the bottom portion 113a (X-Y plane). The second portion 101b is located downstream of the first portion 101a and extends in an opposite direction (–Y-axis direction) to the extension direction of the first portion 101a. The third portion 101c is located downstream of the second portion 101b and extends in the same direction (+Y-axis direction) as the extension direction of the first portion 101a.

By forming the flow channel 101 in a meandering shape in this manner, the length of the flow channel 101 can be made as long as possible within the size of the upper case 113. The shape of the flow channel space 145 is not limited to such a shape, and may have another shape capable of forming a flow channel from the tube mouth 144c to the second opening 142.

The odor detection device 100 has the structure described above. As illustrated in FIG. 3, the odor detection device 100 is formed by stacking the lower case 112, the sensor unit 111, the upper case 113, and the lid 114 in this order, and fixing the fixing portions 112c to the fixing portions 113d, and fixing the fixing portions 113e to the fixing portions 114a with screws or the like.

In this structure, since the flow channel 101 is provided above the sensor chamber 171, it is possible to reduce the size of the odor detection device 100 while providing the flow channel 101. It is also possible to provide the flow channel 101 under the sensor chamber 171. The size of the odor detection device 100 is not particularly limited, and may be, for example, 70 to 90 mm in length (X-axis direction), 65 to 85 mm in width (Y-axis direction), and 50 to 70 mm in height (Z-axis direction).

[Flow of Gas]

In the odor detection device 100, two types of gas flows are formed: a gas flow for odor detection (hereinafter referred to as a detection flow) and a gas flow for cleaning (hereinafter referred to as a cleaning flow).

FIG. 18 to FIG. 22 are schematic views illustrating the detection flow. In the detection flow, the first pump 152 is driven and the second pump 153 is stopped. Hereinafter, this state of the odor detection device 100 is referred to as a first state. In the first state, as indicated by an arrow F1 in FIG. 18, the gas flows into the sensor chamber 171 from the first inlet 172 and is discharged from the first outlet 174. More specifically, the gas flows into the introduction space 143 from the opening 113*f* (see FIG. 19), passes through the first opening 141 and the first opening 122 (see FIG. 20), and flows into the sensor chamber 171 from the first inlet 172 (see FIG. 21). Further, the gas passes through the third opening 124 (see FIG. 20) and the opening 131 (see FIG. 22) from the first outlet 174 and is then discharged.

FIG. 23 to FIG. 27 are schematic views illustrating the cleaning flow. In the cleaning flow, the first pump 152 is stopped and the second pump 153 is driven. Hereinafter, this state of the odor detection device 100 is referred to as a second state. In the second state, as indicated by an arrow F2 in FIG. 23, the gas flows from the sensor chamber 171 into the flow channel 101 through the second outlet 175, and flows from the flow channel 101 into the sensor chamber 171 through the second inlet 173. Further, the gas passes through the second outlet 175 from the sensor chamber 171, flows into the flow channel 101 again, and thereafter circulates through the flow channel 101 and the sensor chamber 171.

Figure 25:
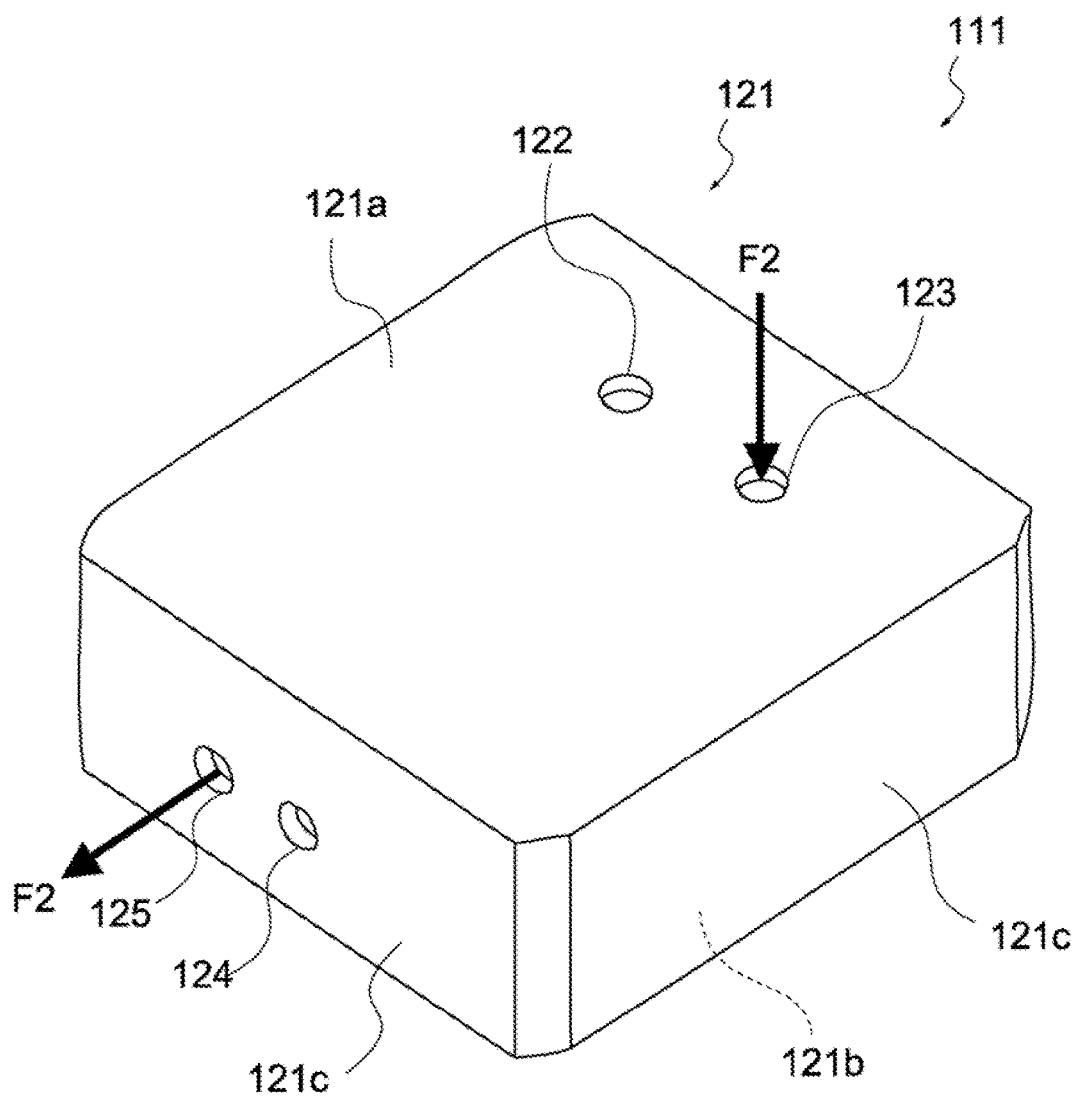
FIG. 25 is a schematic view illustrating the cleaning flow in the sensor unit.
Figure 26:
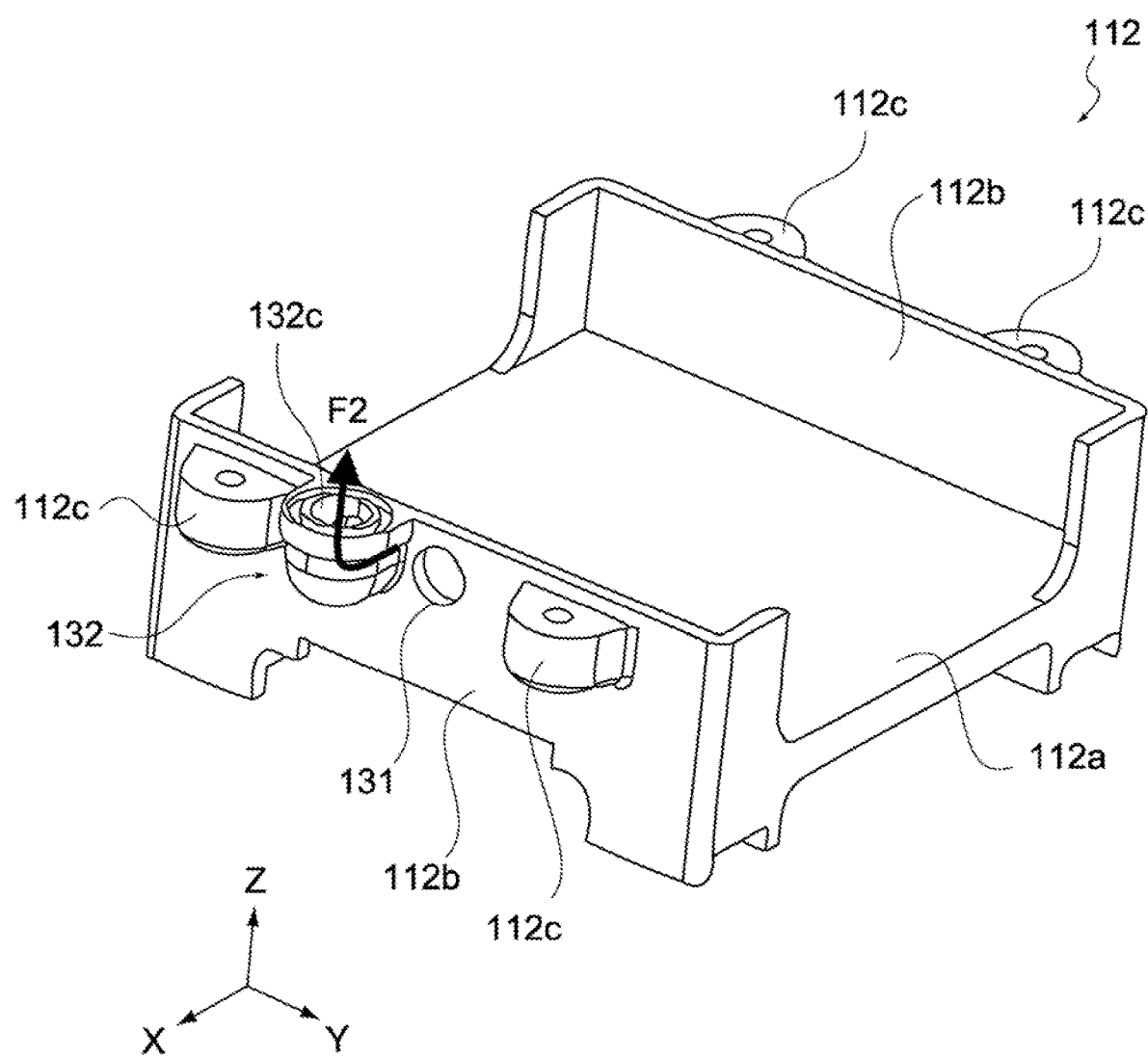
FIG. 26 is a schematic view illustrating the cleaning flow in the lower case.

More specifically, the gas flows from the sensor chamber 171 into the flow channel 101 (see FIG. 15 and FIG. 16) through the second outlet 175 (see FIG. 24) and the fourth opening 125 (see FIG. 25). Further, the gas passes through the second opening 142 and the second opening 123 (see FIG. 25) from the flow channel 101, flows into the sensor chamber 171, and circulates.

[Operation of Odor Detection Device]

The operation of the odor detection device 100 will be described. The odor detection device 100 performs detection of odor components and cleaning. In the detection of the odor components, as described above, the detection flow (see FIG. 18) is generated by driving the first pump 152 and stopping the second pump 153 (the first state). As a result, outside air in the vicinity of the odor detection device 100 is sucked into the sensor chamber 171. The odor component contained in the outside air is adsorbed on the sensitive film of each sensor element 154 and the odor component is detected. After the odor component is detected, cleaning is performed.

Figure 23:
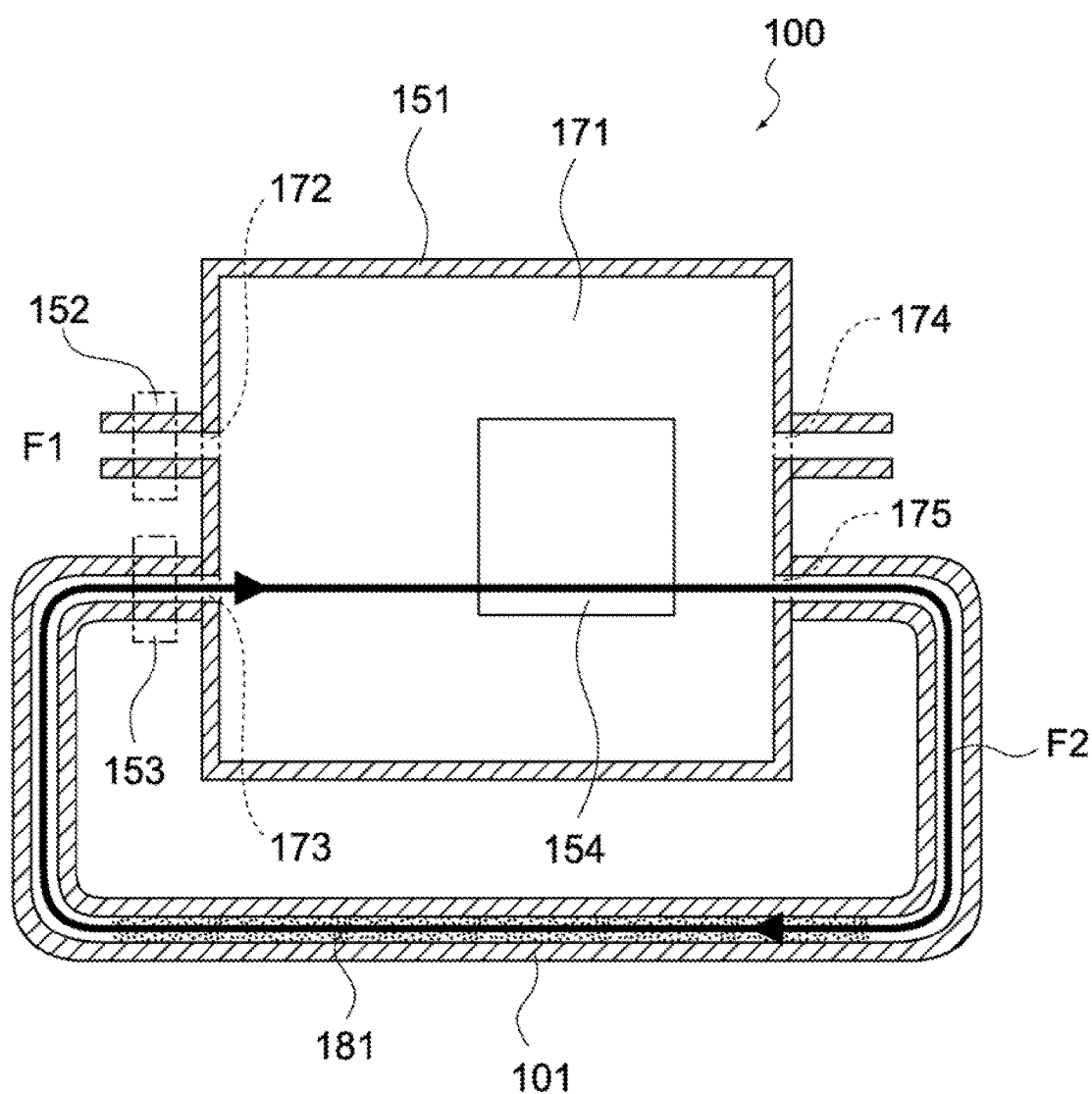
FIG. 23 is a schematic view illustrating a cleaning flow of the odor detection device.
Figure 24:
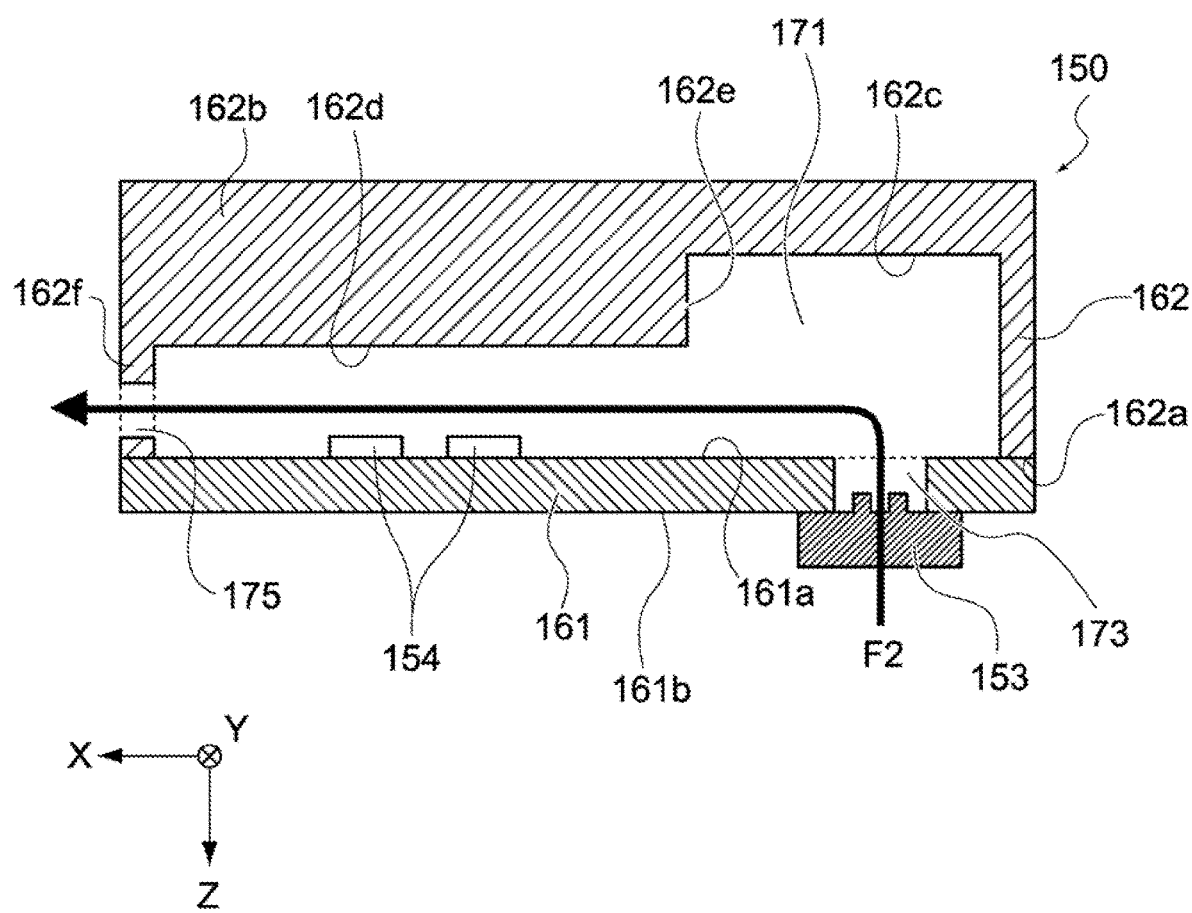
FIG. 24 is a schematic view illustrating the cleaning flow in the sensor module.

In the cleaning, as described above, the first pump 152 is stopped and the second pump 153 is driven (second state) to generate the cleaning flow (see FIG. 23). As a result, the gas in the sensor chamber 171 is sucked into the flow channel 101, and the odor component in the gas is removed by the filter 181. The odor component adsorbed on the sensor element 154 is gradually desorbed from the sensor element 154 as the odor component in the gas becomes diluted and removed by the filter 181. By performing cleaning for a certain period of time, the gas passes through the flow channel 101 many times, and the odor component is removed by the filter 181. Therefore, the odor component adsorbed on the sensor element 154 is removed, and cleaning (refresh) is completed. Thereby, a high cleaning effect can be obtained. By this cleaning, the sensor element 154 is refreshed, and the next detection can be performed.

During execution of the detection flow (see FIG. 18), since the flow channel 101 is closed, the gas does not flow through the flow channel 101, and the odor component to be detected is not removed by the filter 181. When the cleaning flow (see FIG. 23) is executed, outside air can enter the sensor chamber 171 via the first outlet 174 or the first pump 152 that is being stopped.

However, by adopting a diaphragm pump or the like, which is difficult for gas to pass through when stopped, as the first pump 152, the inflow of the outside air from the first pump 152 can be prevented. In addition, even when the outside air flows in from the first outlet 174, since the outlet from the sensor chamber 171 is only the first pump 152, it is possible to substantially prevent the outside air from flowing into the sensor chamber 171 by adopting the pump, which is difficult for gas to pass through when stopped, as the first pump 152.

Therefore, in the odor detection device 100, it is possible to switch between the detection flow and the cleaning flow by switching between the first pump 152 and the second pump 153, and it is not necessary to switch between valves or tubes. Switching between the first state and the second state may be performed by a user, or may be performed by a control unit 300 capable of controlling driving of each of the first pump 152 and the second pump 153. The control unit 300 may be mounted on the control substrate 158 (see FIG. 6), for example.

[Advantages of Odor Detection Device]

Figure 27:
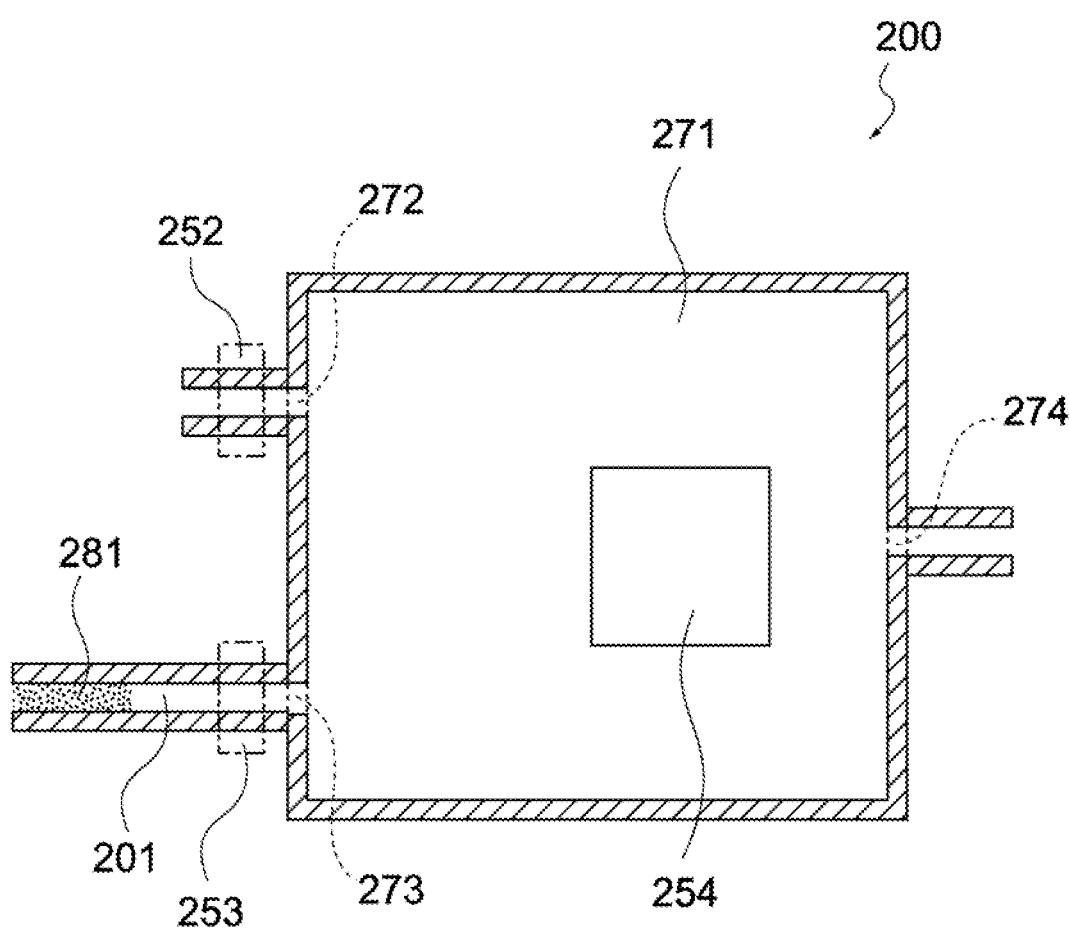
FIG. 27 is a schematic view illustrating an overall structure of an odor detection device in accordance with a comparative example.

Advantages of the odor detection device 100 will be described in comparison with a conventional structure. FIG. 27 is a schematic view of an odor detection device 200 having a conventional structure. As illustrated in the figure, the odor detection device 200 includes a sensor chamber 271, sensor elements 254, a flow channel 201, a first pump 252, a second pump 253, and a filter 281.

The sensor chamber 271 is provided with a first inlet 272, a second inlet 273, and an outlet 274, and houses the sensor elements 254. The flow channel 201 is connected to the second inlet 273, and the filter 281 is disposed in the flow channel 201. The first pump 252 causes gas to flow into the sensor chamber 271 from the first inlet 272. The second pump 253 causes the gas to pass through the flow channel 201 and flow into the sensor chamber 271 from the second inlet 273.

In the odor detection device 200, the first pump 252 is driven and the second pump 253 is stopped when the detection of the odor component is executed. As a result, the outside air flows into the sensor chamber 271 from the first inlet 272 and is discharged from the outlet 274. The sensor element 254 adsorbs and detects an odor component in the gas.

Also in the odor detection device 200, cleaning is executed after the odor component is detected. In the cleaning, the first pump 252 is stopped and the second pump 253 is driven. Accordingly, the outside air passes through the flow channel 201, flows into the sensor chamber 271 from the second inlet 273, and is discharged from the outlet 274. When the outside air passes through the flow channel 201, the odor component is removed by the filter 281, and the sensor element 254 is cleaned by the gas from which the odor component is removed.

Here, in the odor detection device 200, as described above, it is necessary to remove the odor component from the outside air flowing into the flow channel 201 by the filter 281. The amount of the odor component to be removed is large depending on the environment, and the amount of the odor component adsorbed onto the filter 281 continues to increase with the elapse of the cleaning time. Therefore, the filter 281 is required to be a strong filter or a large-sized filter. In addition, when the amount of the odor component contained in the outside air is large, the removal effect of the filter 281 becomes smaller, the cleaning time becomes longer, and the life of the filter 281 becomes shorter.

Instead of using the outside air for cleaning, clean gas can be separately supplied to the sensor chamber for cleaning. In this case, it is necessary to switch between the detection flow path and the clean gas flow path by a valve or the like, and the device becomes complicated and large-scale.

In contrast, in the odor detection device 100, as illustrated in FIG. 23, the gas is circulated in the flow channel 101 and the sensor chamber 171 during cleaning, and the odor component is removed by the filter 181. As the circulation is repeated, the odor component is removed, and a clean gas can be supplied to the sensor element 154.

Further, since the amount of the odor component to be removed is only the amount contained in the sensor chamber 171 and the flow channel 101 at the start of cleaning and the amount adsorbed on the sensor element 154, the amount of the odor component does not become large unlike the conventional structure, and the size of the filter 181 can be reduced and the life thereof can be extended. Further, the detection flow and the cleaning flow can be switched by selection of the pump to be driven, and since the operation of a valve or the like is not required, control is easy. Therefore, the odor detection device 100 has a simple structure and a high cleaning effect.

In addition, the odor detection device 100 has a structure in which the sensor unit 111 including the sensor chamber 171 and the upper case 113 including the filter 181 are stacked. Therefore, the device can be miniaturized.

Further, by providing the step portion 162e having the throttle function in the sensor chamber 171, the gas flowing into the first chamber 171a can be uniformly supplied to the entire second chamber 171b. Accordingly, in the above-described detection flow, it is possible to uniformly supply the outside air to a plurality of the sensor elements 154 and to improve the detection accuracy. In addition, in the above-described cleaning flow, it is possible to quickly remove the odor component adsorbed on each sensor element 154.

[Variation]

Although the odor detection device 100 is composed of the sensor unit 111, the lower case 112, the upper case 113, and the lid 114, the structure is not limited thereto, and other structures capable of implementing the overall structure illustrated in FIG. 4 are also possible. The structure illustrated in FIG. 4 can be modified as long as the above-described detection flow and cleaning flow can be generated. For example, the first pump 152 may be disposed in the sensor chamber 171 (in the vicinity of the first inlet 172), and the second pump 153 may be disposed in the sensor chamber 171 (in the vicinity of the second inlet 173). Further, the second pump 153 may be provided upstream of the filter 181 in the flow channel 101. Further, the first outlet 174 may be provided with a check valve for preventing inflow of outside air. Note that the "first gas delivery unit" may be the first pump 152, a fan or any other appropriate device casuing inflow or outflow, and the "second gas delivery unit" may be the second pump 153, a fan, or any other appropriate device causing inflow or outflow.

What is claimed is:

1. An odor detection device comprising:
   a sensor chamber in which a sensor element is housed, the sensor chamber having a first inlet, a first outlet, a second inlet, and a second outlet, the first outlet being located opposite the first inlet with the sensor element interposed therebetween, the second outlet being located opposite the second inlet with the sensor element interposed therebetween;
   a flow channel including a filter therein, the flow channel being connected to the second outlet and being connected to the second inlet;
   a first gas delivery unit causing inflow of a gas at the first inlet and outflow of the gas at the first outlet; and
   a second gas delivery unit causing outflow of the gas at the second outlet and inflow of the gas at the second inlet.

2. The odor detection device according to claim 1, wherein the flow channel is provided above or under the sensor chamber so as to overlap with the sensor chamber when viewed from above.

3. The odor detection device according to claim 2, wherein the flow channel has a meandering shape in a plane orthogonal to a vertical direction.

4. The odor detection device according to claim 3, wherein the flow channel includes a first portion extending in a first direction, a second portion that is located downstream of the first portion and extends in a second direction opposite to the first direction, and a third portion that is located downstream of the second portion and extends in the first direction.

5. The odor detection device according to claim 1, wherein the sensor chamber includes a first chamber having the first inlet and the second inlet, a second chamber having the first outlet and the second outlet, and a throttle portion restricting gas flow from the first chamber to the second chamber, the first chamber being communicated with the second chamber.

6. The odor detection device according to claim 1, further comprising a control unit configured to alternately achieve a state in which a gas is caused to flow into the sensor chamber from the first inlet and the gas is caused to be discharged from the first outlet and a state in which the gas is caused to flow from the sensor chamber into the flow channel through the second outlet and the gas is caused to flow from the flow channel into the sensor chamber through the second inlet by alternately switching between a first state in which the first gas delivery unit is operated and the second gas delivery unit is stopped and a second state in which the first gas delivery unit is stopped and the second gas delivery unit is operated.

7. An odor detection method comprising:
   a detection step in which a first gas delivery unit is driven and a second gas delivery unit is stopped to cause a gas to flow from a first inlet into a sensor chamber and cause the gas to be discharged from a first outlet, the sensor chamber housing a sensor element for detecting an odor component; and
   a cleaning step in which the first gas delivery unit is stopped and the second gas delivery unit is driven to cause the gas to flow from the sensor chamber into a flow channel through a second outlet and cause the gas from the flow channel to the sensor chamber through a second inlet, the flow channel connecting the second outlet and the second inlet, the flow channel having a filter for removing the odor component therein, the second outlet being provided in the sensor chamber, the second inlet being provided in the sensor chamber.

* * * * *